US012704716B2

(12) United States Patent
Smeeton et al.

(10) Patent No.: US 12,704,716 B2
(45) Date of Patent: Aug. 11, 2026

(54) COMPACT HEAD-UP DISPLAY

(71) Applicant: Dualitas Ltd, Milton Keynes (GB)

(72) Inventors: Timothy Smeeton, Milton Keynes (GB); Jamieson Christmas, Milton Keynes (GB); Rakesh Maharjan, Milton Keynes (GB); Celedonia Krawczyk, Milton Keynes (GB); Daniel Burnham, Milton Keynes (GB); Ruisheng Lin, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 810 days.

(21) Appl. No.: 17/931,597

(22) Filed: Sep. 13, 2022

(65) Prior Publication Data

US 2023/0088953 A1 Mar. 23, 2023

(30) Foreign Application Priority Data

Sep. 21, 2021 (GB) ...................................... 2113454

(51) Int. Cl.
*G02B 27/00* (2006.01)
*G02B 27/01* (2006.01)

(52) U.S. Cl.
CPC ..... *G02B 27/0103* (2013.01); *G02B 27/0081* (2013.01); *G02B 2027/0123* (2013.01)

(58) Field of Classification Search
CPC ............ G02B 27/0103; G02B 27/0081; G02B 2027/0123; G02B 2027/0125;

(Continued)

(56) References Cited

U.S. PATENT DOCUMENTS 3,791,715 A * 2/1974 Lean ........................ G02F 1/335 385/33
2013/0051730 A1* 2/2013 Travers .............. G02B 27/4272 385/37

(Continued)

FOREIGN PATENT DOCUMENTS

CN 108738358 A 11/2018
GB 2589583 A 9/2021

(Continued)

OTHER PUBLICATIONS

Notice of Reasons for Refusal issued on Nov. 22, 2023 in Japanese Application 2022-144084 (5 pages).

(Continued)

*Primary Examiner* — William R Alexander
*Assistant Examiner* — Alaina Marie Swanson
(74) *Attorney, Agent, or Firm* — McDonnell Boehnen Hulbert & Berghoff LLP

(57) ABSTRACT

Disclosed embodiments include a display system comprising a first waveguide pupil expander comprising an input port, output port, a first pair of parallel surfaces, and a second pair of parallel surfaces. The first pair of parallel surfaces is orthogonal to the second pair of parallel surfaces and arranged to light guide a diffracted or diverging (e.g. holographic) light field from the input port to the output port by internal reflection therebetween. A first surface of the first pair of parallel surfaces is partially transmissive-reflective such that the light field is divided at each internal reflection and a plurality of replicas of the light field is transmitted through a region of the first surface that forms the output port. The second pair of parallel surfaces is also arranged to light guide the light field from the input port to the output port by at least one internal reflection.

22 Claims, 14 Drawing Sheets

(58) Field of Classification Search

CPC .......... G02B 2027/015; G02B 27/0101; G02B 27/0172; G02B 27/28; G02B 27/4227; G02B 2027/014; F21V 99/00; F21V 2200/00

USPC .......................................................... 359/618

See application file for complete search history.

(56) References Cited

U.S. PATENT DOCUMENTS

| | | | | |
|---|---|---|---|---|
| 2018/0059305 | A1* | 3/2018 | Popovich | G02B 27/0103 |
| 2018/0292592 | A1 | 10/2018 | Danziger | |
| 2019/0056591 | A1* | 2/2019 | Tervo | G02B 6/0038 |
| 2019/0212557 | A1* | 7/2019 | Waldern | G02B 27/0179 |
| 2020/0292827 | A1 | 9/2020 | Ishihara | |

FOREIGN PATENT DOCUMENTS

| | | | | | |
|---|---|---|---|---|---|
| JP | 2010-533316 | A | | 10/2010 | |
| JP | 2018028703 | A | * | 2/2018 | G02B 30/24 |
| KR | 10-2018-0060199 | A | | 6/2018 | |
| KR | 20180060199 | A | * | 6/2018 | G02B 6/0028 |
| KR | 10-2019-0054081 | A | | 5/2019 | |
| KR | 10-2021-0004833 | A | | 1/2021 | |
| WO | 2014/009717 | A1 | | 1/2014 | |
| WO | WO 2017/223121 | A1 | | 12/2017 | |
| WO | 2019/111820 | A1 | | 6/2019 | |
| WO | 2021/110746 | A1 | | 6/2021 | |

OTHER PUBLICATIONS

Office Action issued by the Chinese Patent Office on May 28, 2025 in CA 202211152200.X (7 pages).

English Language translation of Office Action issued by the Chinese Patent Office on May 28, 2025 in CA 202211152200.X (7 pages).

Combined Search and Examination Report issued in GB 2113454.9 on Jul. 4, 2022 (11 pages).

Office Action issued by the Korean Patent Office on Jul. 8, 2024 in KR 10-2022-0119415 (13 pages).

English language translation of Office Action issued by the Korean Patent Office on Jul. 8, 2024 in KR 10-2022-0119415 (13 pages).

Examination Report issued in GB 2113454.9 on Oct. 25, 2023 (4 pages).

Office Action issued by the Mexican Patent Office on Jun. 24, 2025 in Mexican Patent Application MX/a/2022/011693 (5 pages).

English Language translation of Office Action issued by the Mexican Patent Office on Jun. 24, 2025 in Mexican Patent Application MX/a/2022/011693 (5 pages).

* cited by examiner

COMPACT HEAD-UP DISPLAY

CROSS-REFERENCE TO RELATED APPLICATIONS

This application claims priority under 35 U.S.C. § 119 to UK Patent Application GB 2113454.9, titled "Compact Head-Up Display," filed on Sep. 21, 2021, and currently pending. The entire contents of GB 2113454.9 are incorporated by reference herein for all purposes.

FIELD

The present disclosure relates to pupil expansion or replication, in particular, for a diffracted light field comprising diverging ray bundles. More specifically, the present disclosure relates a display system comprising a waveguide pupil expander and to a method of pupil expansion using a waveguide. Some embodiments relate to two-dimensional pupil expansion, using first and second waveguide pupil expanders. Some embodiments relate to picture generating unit and a head-up display, for example an automotive head-up display (HUD).

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field. In accordance with the method disclosed herein, the complex light field is propagated forward and back—e.g. in the +z and −z directions—between a hologram plane and an image plane. Light propagation can be simulated or modelled using any one of a number of different approaches or mathematical transforms familiar to the person skilled in the art of wave optics.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field comprising diverging ray bundles. As discussed above, pupil expansion (which may also be referred to as “image replication” or “replication” or “pupil replication”) enables the size of the area at/from which a viewer can see an image (or, can receive light of a hologram, which the viewer’s eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a “light cone”. Thus, the size of the diffracted light field (as defined on a two-dimensional plane) increases with propagation distance from the corresponding diffractive structure (i.e. display device).

The spatial light modulator may be arranged to display a hologram. The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer’s eye can be located, in order to see/receive light that is output by the system.

In the present disclosure, the term “replica” is merely used to reflect that spatially modulated light is divided such that a complex light field is directed along a plurality of different optical paths. The word “replica” is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term “replica” is independent of propagation distance and so the two branches or paths of light associated with a replication event are still referred to as “replicas” of each other even if the branches are a different length, such that the complex light field has evolved differently along each path. That is, two complex light fields are still considered “replicas” in accordance with this disclosure even if they are associated with different propagation distances—providing they have arisen from the same replication event or series of replication events.

According to a first aspect, a display system is provided comprising a first waveguide pupil expander. The first waveguide pupil expander comprises an input port, output port, a first pair of parallel surfaces and a second pair of parallel surfaces. The first pair of parallel surfaces are orthogonal to the second pair of parallel surfaces. The first pair of parallel surfaces is arranged to light guide a diffracted or diverging (e.g. holographic) light field from the input port to the output port by internal reflection therebetween. A first surface of the first pair of parallel surfaces is partially transmissive-reflective such that the light field is divided at each internal reflection and a plurality of replicas of the light field is transmitted through a region of the first surface that forms the output port. The second pair of parallel surfaces is also arranged to light guide the light field from the input port to the output port by at least one internal reflection. The input port may be formed on/by the first surface or on/by a second surface of the first pair of parallel surfaces.

A “diffracted light field” or “diffractive light field” in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

In some embodiments, the second pair of parallel surfaces are elongate surfaces, being relatively long along a first dimension and relatively short along a second dimension, for example being relatively short along each of two other dimensions, with each dimension being substantially orthogonal to each of the respective others.

As a result of the second pair of parallel surfaces also being arranged to light guide the light field from the input port to the output port by at least one internal reflection, the first waveguide pupil expander ensures that light of a diffracted light field is not lost through the second pair of parallel surfaces, during propagation of the light within the first waveguide pupil expander. This can be particularly advantageous when the first waveguide pupil expander is relatively thin, in particular if the size of the first waveguide pupil expander along one or both of its relatively short dimensions is substantially equal to or less than the size of the light field defined by the diffracted or diverging light, when it is propagating through the first waveguide pupil expander.

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In aspects, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance. In some embodiments, the light field size within the first waveguide pupil expander exceeds the size of the first waveguide pupil expander—that is, the light field size is greater than the size of the first waveguide pupil expander in at least one dimension. In other words, the light field size may be substantially equal to or greater than at least one of: a "first spacing size", defined between the first and second surfaces of the first pair of parallel surfaces; and "a second spacing size", defined between first and second surfaces of the second pair of parallel surfaces, during internal reflection of the light field within the first waveguide pupil expander. In other words, the size of the light field may be equal to or greater than a thickness of the first waveguide pupil expander, in at least one dimension. in accordance with this disclosure, the second pair of parallel surfaces are configured to provide reflection of the light field, to retain it within the first waveguide pupil expander and to ensure that it only leaves the first waveguide pupil expander via the output port, as a result of the internal reflection between the surfaces of the first pair of parallel surfaces.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander. A first surface of the third pair of parallel surfaces may be partially transmissive reflective such that the light field is divided at each internal reflection and a plurality of replicas of the light field are transmitted through a region of the first surface on the second waveguide pupil expander, which forms its output port.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the third pair of parallel surfaces of the second waveguide pupil expander, which comprises its input port, may be shaped, sized, and/or located so as to correspond to an area defined by the output port on the first surface of the first pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In some embodiments, a waveguide coupler may be provided between the first and second waveguide pupil expanders. The waveguide coupler may be configured to, either directly or indirectly, receive some or all of the plurality of replicas of the light field that are output by the first waveguide pupil expander. The waveguide coupler may be further configured to output said some or all of the plurality of replicas and to transmit them, either directly or indirectly, towards the second waveguide pupil expander.

The waveguide coupler may have a receiving face, comprising an input port, which is configured to receive some of, preferably most of, preferably all of, the plurality of replicas of the light field output by the first waveguide pupil expander. The receiving face of the waveguide coupler may be arranged to be parallel to the first pair of parallel surfaces of the first waveguide pupil expander, but this is not essential. One or more other elements may be provided to ensure a suitable angle of incidence of the replicas of the light field into waveguide coupler. The waveguide coupler may further comprise a transmitting face, comprising an output port, which is configured to transmit some of, preferably most of, preferably all of, the plurality of replicas of the light field towards the second waveguide pupil expander.

The waveguide coupler may further comprise a fourth pair of parallel reflective surfaces, wherein the fourth pair of parallel surfaces are arranged to guide the light field from the receiving face towards the transmitting face of the waveguide coupler by at least one internal reflection. The fourth pair of parallel surfaces may substantially correspond to the second pair of parallel surfaces of the first waveguide pupil expander. For example, a first surface within the fourth pair of parallel surfaces may be coplanar with a first surface within the second pair of parallel surfaces and/or a second surface within the fourth pair of parallel surfaces maybe coplanar with a second surface within the second pair of parallel surfaces.

The second spacing size, which comprises the size of the separation between the two surfaces of the second pair of parallel surfaces, may be substantially equal to the size of the separation between the two surfaces of the fourth pair of parallel surfaces. Thus, the correspondence between the fourth pair of parallel surfaces and the second pair of parallel surfaces may determine that the first waveguide pupil expander and the waveguide coupler occupy a common plane, or layer.

The first waveguide pupil expander and optionally also the waveguide coupler may be arranged to occupy a first plane or layer. The second waveguide pupil expander may be arranged to occupy a second, different, plane or layer. The second layer may be substantially parallel to the first layer.

The shape and size of the second waveguide pupil expander may be said to define an area or "footprint" on/within the second layer. The first waveguide pupil expander and optionally also the waveguide coupler may be arranged within an area of the first layer that is smaller than or equal to the size of the footprint of the second waveguide pupil expander on the second layer. One or more additional elements, for example a mirror, may also be arranged within that area of the first layer.

The first and second layers may be arranged relative to one another such that the footprint of the second waveguide pupil expander on the second layer overlays the area of the first layer within which the first waveguide pupil expander and optionally also the waveguide coupler are arranged. In other words, in such an arrangement, adopting a "plan" or "overhead" view of the second waveguide pupil expander on the second layer would prevent the viewer from seeing the area of the first layer that occupied by the first waveguide pupil expander and optionally also occupied by the waveguide coupler and/or by one or more additional elements.

The waveguide coupler may have a shape that substantially fills a space, or gap, between the first and second waveguide pupil expanders. For example, the waveguide coupler may have a substantially triangular shape.

In order to provide suitable launch conditions to achieve internal reflection within the first and second waveguide pupil expanders, an elongate dimension of the first waveguide pupil expander may be tilted relative to the first and second dimensions of the second waveguide pupil expander. Such tilting may create an inherently triangular-shaped gap, which the waveguide coupler may be arranged to occupy at least partially.

The display system may further comprise an element arranged to fold the optical path of the replicas of the light field between the first and second waveguide pupil expanders, for example between the waveguide coupler and the second waveguide pupil expander. The element may comprise a fold mirror. The fold mirror may be arranged to occupy the first layer that the first waveguide pupil expander and optionally also the waveguide coupler occupies. The fold mirror may be arranged to direct light from the first layer towards the second layer. The fold mirror may be arranged to provide suitable launch conditions to achieve internal reflection within the second waveguide pupil expander. Use of the fold mirror may enable the second layer to overlay the first layer, thereby enabling a compact and reduced volume system.

In embodiments in which the footprint of the second waveguide pupil expander on the second layer overlays the area of the first layer within which the first waveguide pupil expander, and optionally also the waveguide coupler, is arranged, the second waveguide pupil expander may be said to define respective first and second dimensions, or axes, of the footprint. The light output by the first waveguide pupil expander may be arranged to be parallel to one of said first and second dimensions of the footprint. An elongate dimension of the first waveguide pupil expander may be arranged to be tilted with respect to the respective other of said first and second dimensions of the footprint.

According to some embodiments, a control device may be disposed within the display system. For example, it may be disposed downstream of the first waveguide pupil expander, such as between the first waveguide pupil expander and second waveguide pupil expander, wherein the control device comprises an array of apertures, each aperture being selectively operable between a transmissive state and a non-transmissive state.

The control device may thus be configured to selectively control which light is transmitted, and which light is not transmitted, between the first waveguide pupil expander and the second waveguide pupil expander on a dynamic basis. In some aspects, the control device is controllable to permit some of the replicas of the output diffractive light field from the first waveguide pupil expander to be transmitted towards the second waveguide pupil expander and to prevent certain others from doing so. The control device may be controlled to allow all replicas of a given diffracted light field to be transmitted to the second waveguide pupil expander but not all at exactly the same time. For example, the transmission of the replicas may be staggered, or sequenced, or time controlled in another manner. For example, this can enable the control device and therefore the display system to accommodate movement of the viewer's head and therefore movement of their eye box. Alternatively, or additionally, it may also be useful in accommodating the fact that the viewer almost certainly has multiple viewing apertures—i.e., two eyes—and to therefore ensure that those two eyes do not receive holographic light corresponding to identical image content at exactly the same time, as the human brain inherently expects at least slightly different views for each eye, since the eyes are physically displaced from one another and have different respective inherent fields of view.

The array of apertures of the control device may extend in the elongate direction of the first waveguide pupil expander. The apertures may be physically discrete apertures, or they may be software-controlled portions of the control device. As such, the size and number and location of the apertures, within the control device, may be dynamically variable. The control device may comprise a plurality of liquid crystal cells or areas independently switchable between a transmissive and a non-transmissive state.

The control device may be disposed between the first waveguide pupil expander and waveguide coupler, or between the waveguide coupler and second waveguide pupil expander or between the fold mirror and second waveguide pupil expander.

In some embodiments, the first waveguide pupil expander and waveguide coupler may be bonded together. In some embodiments, the first waveguide pupil expander, waveguide coupler and control device may be bonded together. The bonding, in any such aspect, may comprise any suitable type of attachment between the respective component parts. Bonding component parts of a display system together can enhance the overall mechanical and thermal stability of the display system. It can also enhance and secure optical alignment between the component parts, thus ensuring correct propagation of light through the system and to the viewer.

Each "waveguide pupil expander" performs pupil expansion by replicating the light of the pupil.

According to a second aspect, a light engine is arranged in a stacked or layered configuration comprising a first layer and a second layer. The first layer comprises a first pupil replicator and a waveguide coupler. The first pupil replicator is arranged to receive a diffracted light field from a diffractive structure having a pupil. The first pupil replicator is substantially elongated. The second layer comprising a second pupil replicator. The second pupil replicator is substantially planar. The second pupil replicator comprises a first major surface arranged to form an input and a second major surface arranged to form an output of the light engine. The waveguide coupler is arranged to couple an output of the first pupil replicator to the input of the second pupil replicator. The first layer and second layer are substantially parallel and adjacent to one another.

The first pupil replicator may be arranged to replicate the pupil of the diffractive structure in a first direction and the second pupil replicator may be arranged to replicate the pupil of the diffractive structure in a second direction. The first direction may be substantially perpendicular to the second direction.

The first pupil replicator and waveguide coupler may be arranged within the footprint of the second pupil replicator, wherein the footprint comprises an area that the respective layer occupies when viewed in the direction substantially perpendicular to that layer.

The first pupil replicator may comprise a primary pair of opposing surfaces arranged to provide light guiding therebetween and pupil replication.

The waveguide coupler may comprise a primary pair of opposing surfaces comprising an input surface and an output surface, respectively, wherein the input surface and the output surface are at an angle to each other.

The first pupil replicator and waveguide coupler may be substantially coplanar.

The first pupil replicator and waveguide coupler of the first layer may be arranged to waveguide the diffracted light field in a plane substantially parallel to the second layer, wherein "waveguide" means propagate light by internal reflection.

The second layer may be defined by first and second axes, wherein an elongate dimension of the first pupil replicator is angled with respect to at least one of the first and second axes of the second layer. The angle of the elongate dimension of the first pupil replicator with respect to the first axis or second axis of the second layer may be substantially equal to the angle of incidence of the diffracted light received by the first pupil replicator.

The second pupil replicator may have a substantially quadrilateral cross-sectional shape.

The input of the second pupil replicator may be elongated and correspond to the first axis of the second layer.

The first and second major surfaces of the second pupil replicator may form a primary pair of opposing surfaces arranged to provide light guiding therebetween and pupil replication.

The second pupil replicator of the second layer may be arranged to waveguide the diffracted light field in a plane substantially parallel to the first layer.

The first pupil replicator and the waveguide coupler may be fixed to the second major surface of the second pupil replicator.

The first pupil replicator and the waveguide coupler may each comprise a secondary pair of opposing surfaces arranged to trap the diffracted light field within the plane thereof, wherein "trap" means prevent diffracted light leaving therethrough. At least one surface of each secondary pair of opposing surfaces may comprise a reflective component (e.g. mirror coating) and the at least one surface of each secondary pair of opposing surfaces may be fixed to a common substrate via the reflective component. The common substrate may be the second pupil replicator or a component of a vehicle housing the light engine.

The first pupil replicator and the waveguide coupler may be bonded together.

The light engine may further comprise a control device. The control device may comprise a plurality of independently controlled apertures arranged to determine which pupil replicas are relayed from the first pupil replicator to the second pupil replicator. The first pupil replicator, the waveguide coupler and/or the control device may be bonded together.

According to a third aspect, a head-up display for a vehicle comprises a first pupil replicator, second pupil replicator and waveguide coupler. The first pupil replicator extends in a first direction. The first pupil replicator is arranged to receive a holographic light field from a spatial light modulator having a pixel array defining a limiting aperture of the head-up display. A holographic light field is a complex light field spatially modulated in accordance with a hologram displayed on the spatial light modulator. The second pupil replicator extends in the first direction and in a second direction perpendicular to the first direction. The second pupil replicator comprises a first major surface forming an output and a second major surface parallel to the first major surface. The waveguide coupler is arranged to optically couple the output of the first pupil replicator to an input of the second pupil replicator. The first pupil replicator and the waveguide coupler are arranged within a planar layer substantially parallel and adjacent to the second major surface of the second pupil replicator. Optionally, the first pupil replicator and waveguide coupler may be attached to the second major surface of the second pupil replicator or structural framework of the vehicle housing the head-up display.

There is also provided a light engine comprising a first layer comprising a first pupil replicator, wherein the first pupil replicator is substantially planar and comprises a first major surface arranged to form an input and a second major surface arranged to form an output. The light engine further comprises a second layer comprising a second pupil replicator and a waveguide coupler arranged to couple an output of the second pupil replicator to the input of the first pupil replicator, wherein the second pupil replicator is substantially elongated and waveguide coupler is substantially planar, wherein the first layer is defined by first and second axes and wherein an elongate dimension of the second pupil replicator is angled with respect to at least one of said first and second axes, in order that a light footprint of the second layer falls within a light footprint of the first layer.

The surface area of the first layer may be substantially equal to or greater than, for example slightly greater than, the surface area of each of the major surfaces of the first pupil replicator. In other words, the first layer may comprise only the first pupil replicator or it may also comprise other matter, and/or one or more other components, in addition to comprising the first pupil replicator.

The first pupil replicator may be quadrilateral in shape. The length and breadth respectively of the quadrilateral may be substantially parallel to the first and second axes that define the first layer of the light engine.

The first layer and the second layer may be substantially parallel and adjacent. Therefore, the first and second layers may be provided in a compact and space saving form.

The first pupil replicator may be arranged to replicate in a first direction and the second pupil replicator may be arranged to replicate in a second direction, wherein the second pupil replicator is angled on the second layer.

The light footprint of each layer may be defined as being the footprint, or the area, that it occupies when viewed in the direction perpendicular to the first layer and second layer. The second pupil replicator may be angled on the second layer such that the light footprint of the second layer falls within the light footprint of the first layer. Therefore, the two layers may be provided together in a form that has a cross-sectional area that does not exceed the cross-sectional area of the first layer.

There is also provided a light engine comprising a first pupil replicator extending in a first direction and in a second direction, perpendicular to the first direction, wherein the first pupil replicator comprises a first major surface forming an output and a second major surface parallel to the first major surface. The light engine further comprises a second pupil replicator extending in the first direction and arranged to receive a diffracted light field from a spatial light modulator, and a waveguide coupler between the first pupil replicator and second pupil replicator, wherein the second pupil replicator and waveguide coupler are disposed on a plane substantially parallel and adjacent to the second major surface of the first pupil replicator.

The second pupil replicator (which may instead be referred to as being a "pupil expander") may comprise a primary pair of opposing surfaces arranged to provide light guiding therebetween and pupil replication in the first direction. The waveguide coupler may comprise a primary pair of opposing surfaces forming an input and output, respectively, wherein the input surface and the output surface are at an angle to each other. The input surface and output surface may meet, or touch, one another at an apex or corner.

The second pupil replicator and waveguide coupler may each comprise a respective secondary pair of opposing surfaces arranged to trap the diffracted light field within the plane thereof. Therefore, when diffractive or diverging light is input into the second pupil replicator or waveguide, it will be arranged to prevent escape of the light out of its secondary pair of opposing surfaces. For each of the second pupil replicator and the waveguide coupler, the respective secondary pair of opposing surfaces may be arranged substantially perpendicular to the corresponding primary pair of opposing surfaces.

The first pupil expander may comprise a primary pair of opposing surfaces arranged to provide light guiding therebetween and pupil replication in the second direction.

The second pupil replicator and the waveguide coupler may be fixed to the second major surface of the first pupil replicator.

At least one surface of each secondary pair of opposing surfaces (of the second pupil replicator and of the waveguide coupler) may fixed to a common substrate. The common substrate may be the second pupil replicator.

The light engine may form part of a head-up display (HUD), such as a vehicle HUD. At least one surface of each secondary pair of opposing surfaces may be bonded to another component or part of a vehicle in which the HUD is to be provided. The common substrate may therefore be a component of a vehicle housing the light engine. For example, it may be a chassis of an automotive vehicle.

Bonding the second pupil replicator and the waveguide coupler to a common substrate helps to lower cost of manufacturing and to ensure robustness of the light engine, for example by ensuring that it is provided in a compact form, for example in a relative flat, streamlined form.

The second pupil replicator and waveguide coupler may be arranged within the footprint of the first pupil replicator. The light engine may be arranged in a stacked/layered configuration comprising a first layer and second layer, wherein the first layer comprises the first pupil replicator and waveguide coupler and the second layer comprises the second pupil replicator, or vice versa.

The first layer and second layer may be substantially parallel and adjoining.

The second pupil replicator and waveguide coupler may be arranged to propagate light in a plane substantially parallel with the plane of the first pupil replicator.

The second pupil replicator may be arranged to replicate the diffracted light field in the first direction and the first pupil replicator may be arranged to replicate the diffracted light field in the second direction.

The second pupil replicator may comprise a first pair of opposing surfaces arranged to wave guide in a plane parallel to the plane of the first pupil expander.

The second pupil expander may comprise a second pair of opposing surfaces arranged to prevent diffracted light field from leaving the first pupil expander through said second pair of opposing surfaces.

The second pair of opposing surfaces may be perpendicular to the first pair of opposing surfaces. At least one surface of the second pair of opposing surfaces may comprise a reflective coating arranged to provide internal reflection, within the second pupil replicator.

There is also provided a light engine comprising a first pupil replicator extending in a first direction and arranged to receive a diffracted light field from a spatial light modulator (SLM), a second pupil replicator extending in the first direction and in a second direction perpendicular to the first direction, wherein the second pupil replicator comprises a first major surface forming an output and a second major surface parallel to the first major surface, and a waveguide coupler arranged to optically couple the output of the first pupil replicator to an input of the second pupil replicator, wherein the first pupil replicator and waveguide coupler are fixed to the second major surface of the second pupil replicator.

By providing the first pupil replicator and waveguide coupler fixed to the second major surface of the second pupil replicator, the light engine may be provided in a compact and streamlined and robust form. For example, fixing the components to one another may protect the light engine against potential damage that might otherwise occur when the light engine in provided in an unstable environment, such as in a moving or vibrating environment, for example in a vehicle.

The first pupil replicator and waveguide coupler may be provided within a common plane, or common layer. The SLM, and optionally the light source too, may also be provided within that common layer. The second pupil replicator may be provided within a second, different layer.

There is also provided a head-up display (HUD) system, which comprises the display device of any of the above-described aspects. The HUD system may be implemented in a vehicle, including but not limited to an automotive vehicle. The HUD system may further comprise an optical combiner such as a windscreen, or windshield. In some aspects, the display system may be configured to direct output light towards the optical combiner and the optical combiner may be arranged to direct (or, redirect) the output light towards an eyebox of the intended viewer. The eyebox may be substantially orthogonal to a plane defined by the second waveguide pupil expander.

There is also provided a method is provided of providing pupil expansion for a diffracted light field, the method comprising directing the diffracted light field into a first waveguide pupil expander, wherein the first waveguide pupil expander comprises an input port, output port, a first pair of parallel surfaces and a second pair of parallel surfaces, wherein the first pair of parallel surfaces are orthogonal to the second pair of parallel surfaces. The method further comprising guiding the diffracted light field from the input port to the output port by internal reflection between the first pair of parallel surfaces, wherein a first surface of the first pair of parallel surfaces is partially transmissive-reflective such that the light field is divided at each internal reflection and a plurality of replicas of the light field are transmitted through a region of the first surface that forms the output port; and wherein the second pair of parallel surfaces are also arranged to light guide the light field from the input port to the output port by at least one internal reflection.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
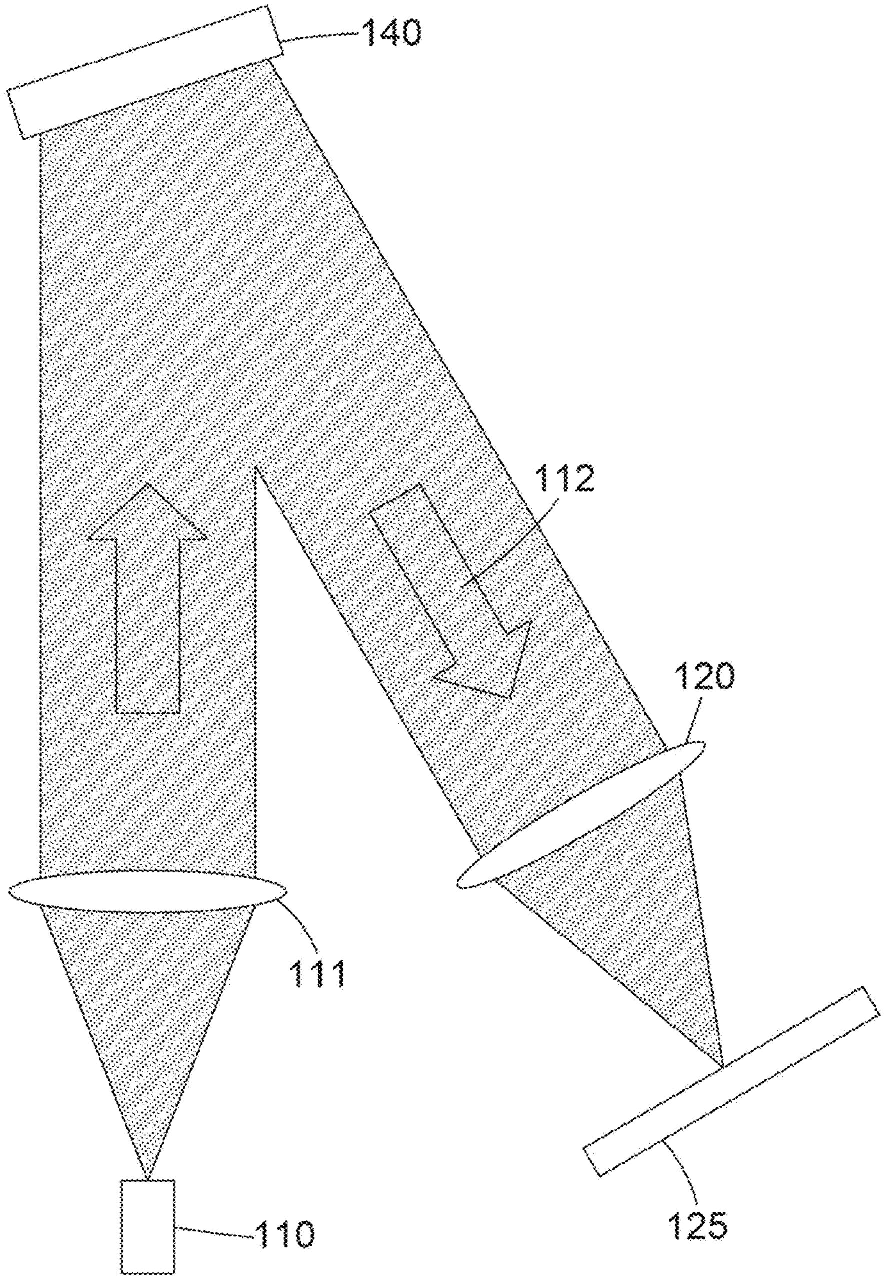
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
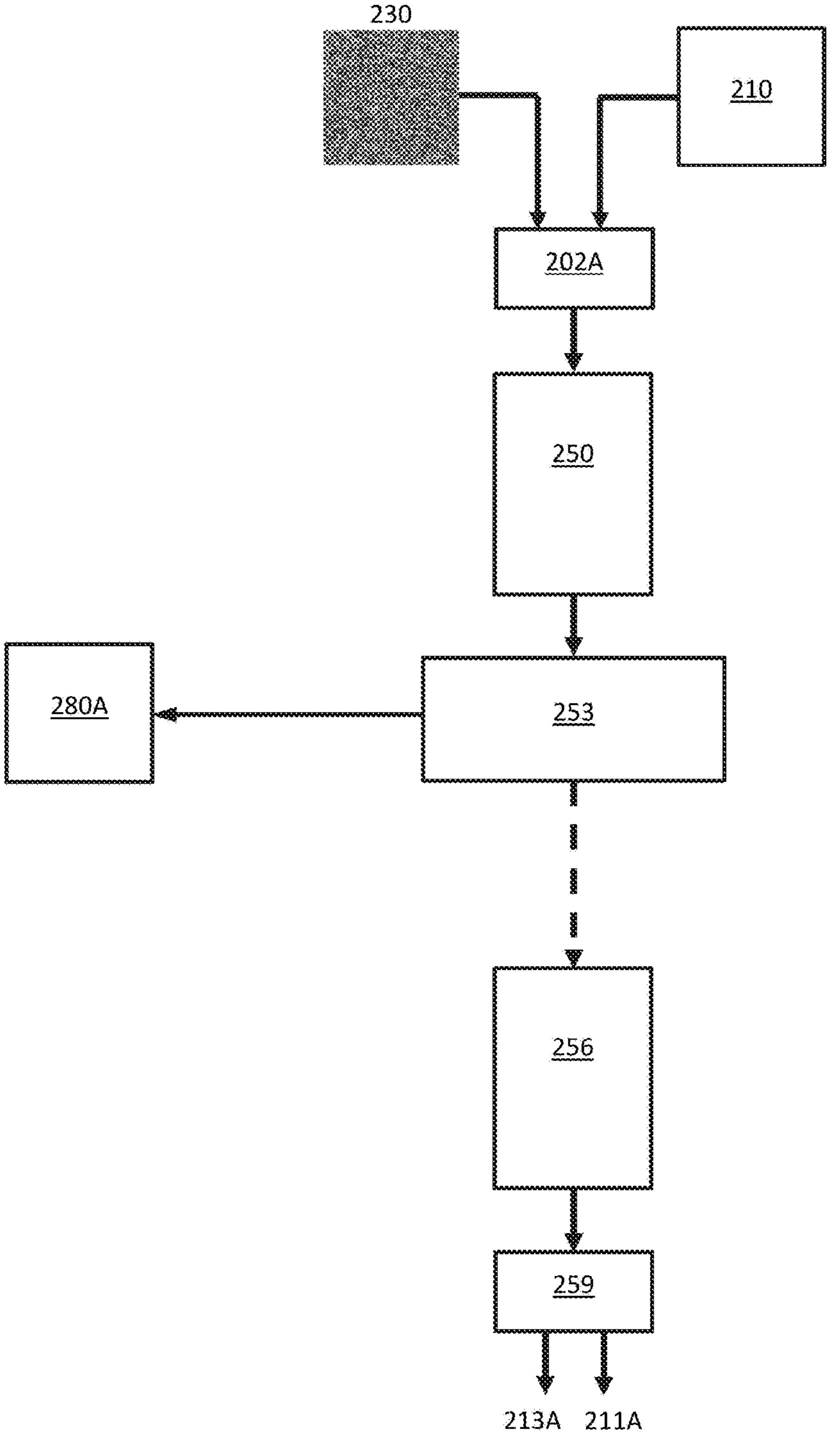
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
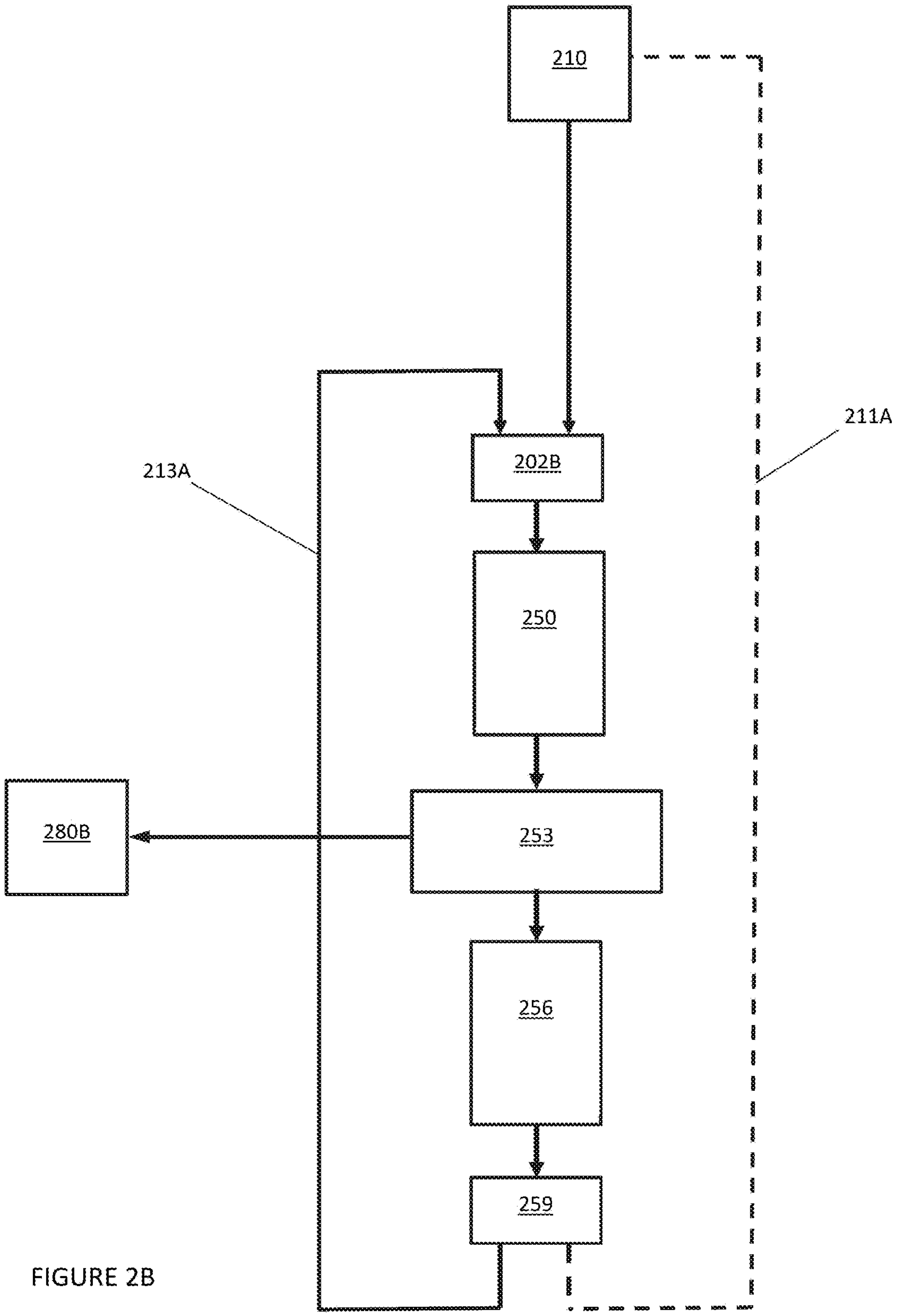
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
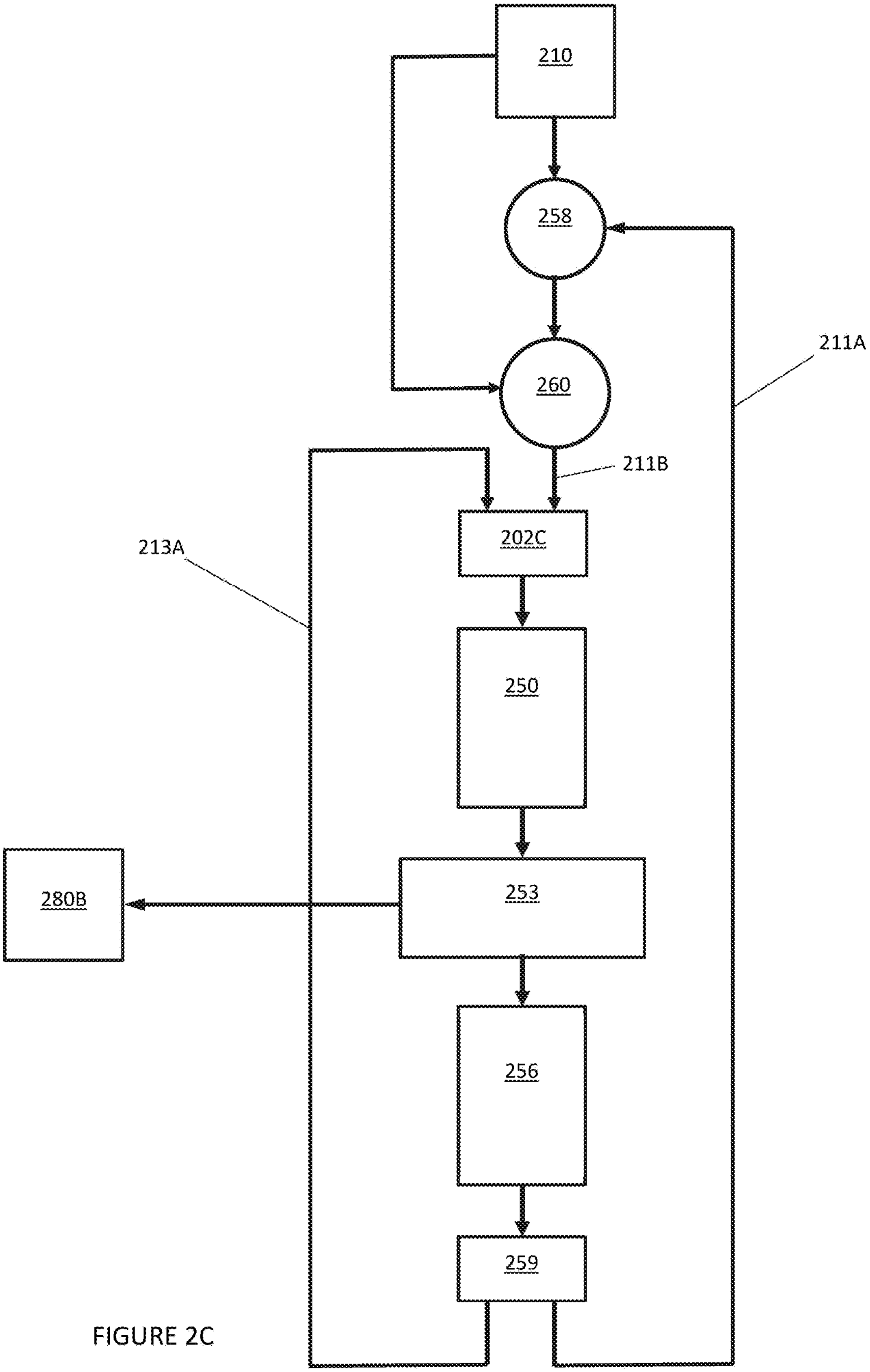
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
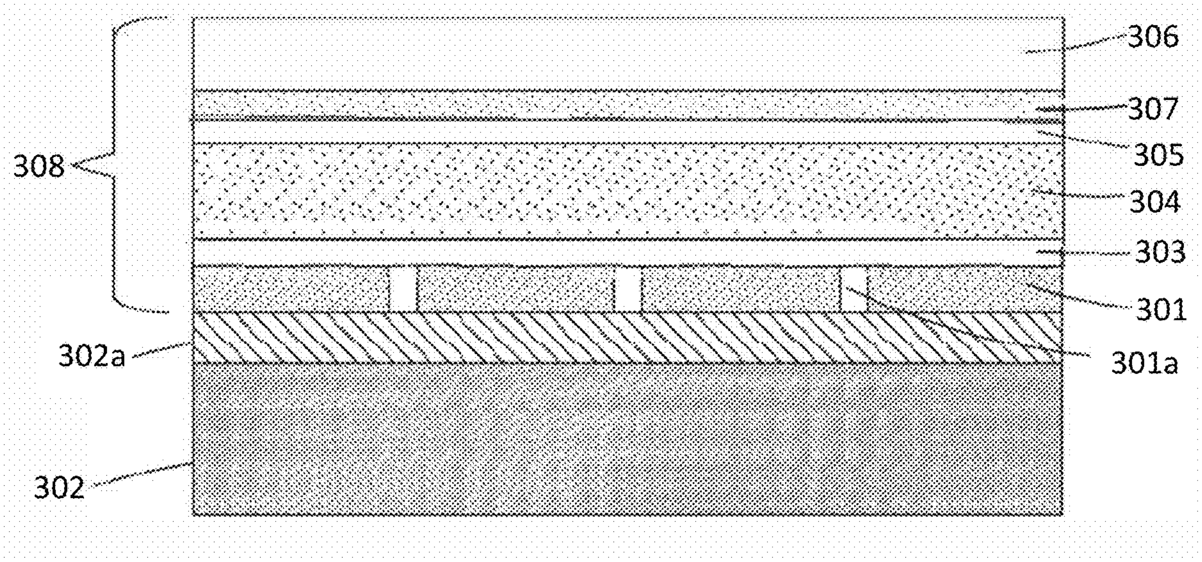
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Light Channeling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

Figure 7:
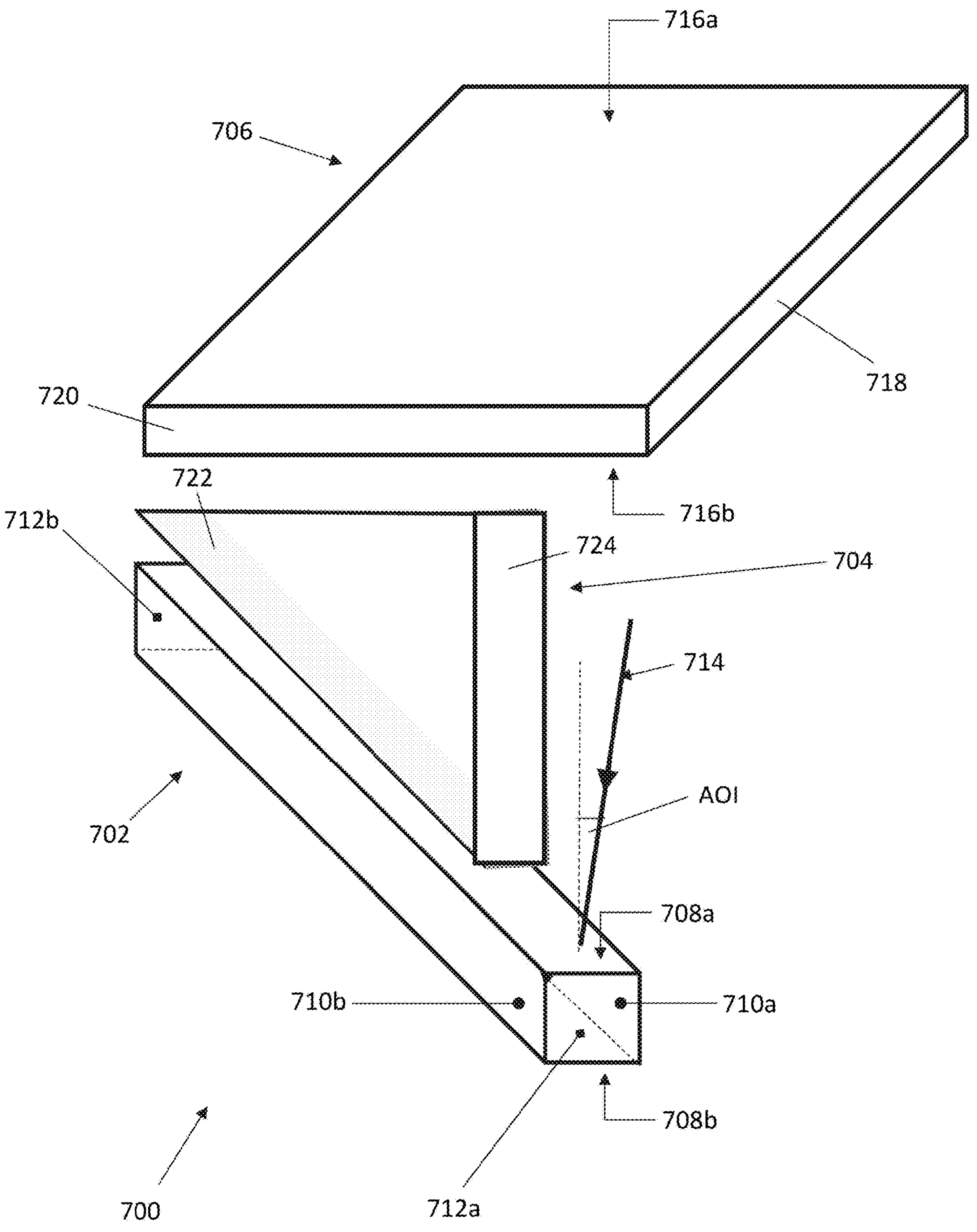
FIG. 7 shows an improved display system comprising a two dimensional pupil expander.

A display system and method is described herebelow, which comprises a waveguide pupil expander, as will be understood further from the description of FIG. 7 et seq. As will be familiar to the skilled reader, a waveguide may be regarded as being a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SL M. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channeling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 4A:
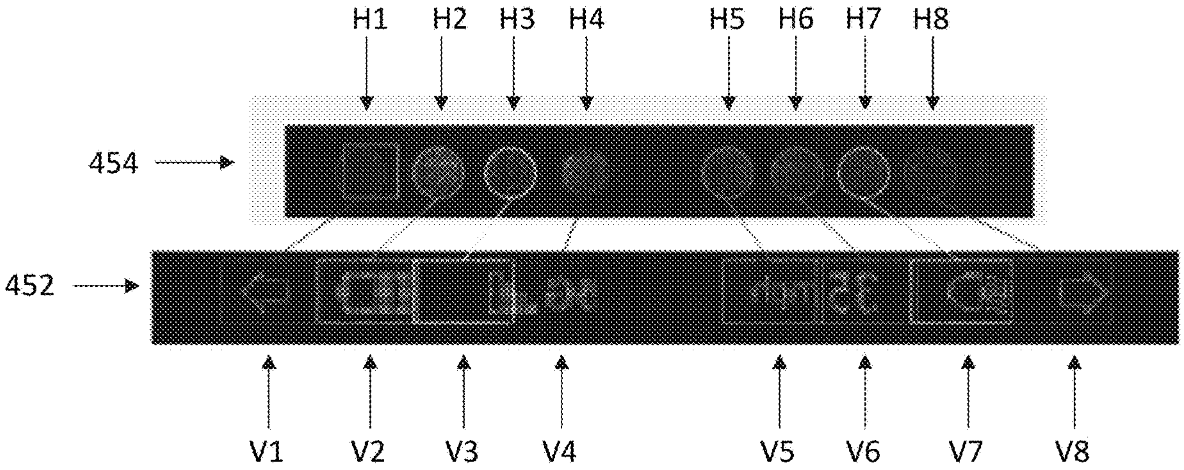
FIG. 4A shows an image comprising a plurality of image areas (bottom) and corresponding hologram comprising a plurality of hologram components (top)
Figure 4B:
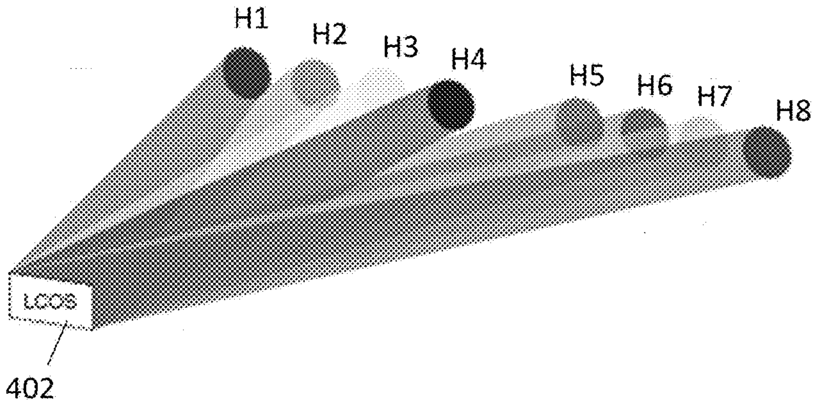
FIG. 4B shows a hologram characterised by the routing or channeling of holographically encoded light into a plurality of discrete hologram channels.
Figure 5:
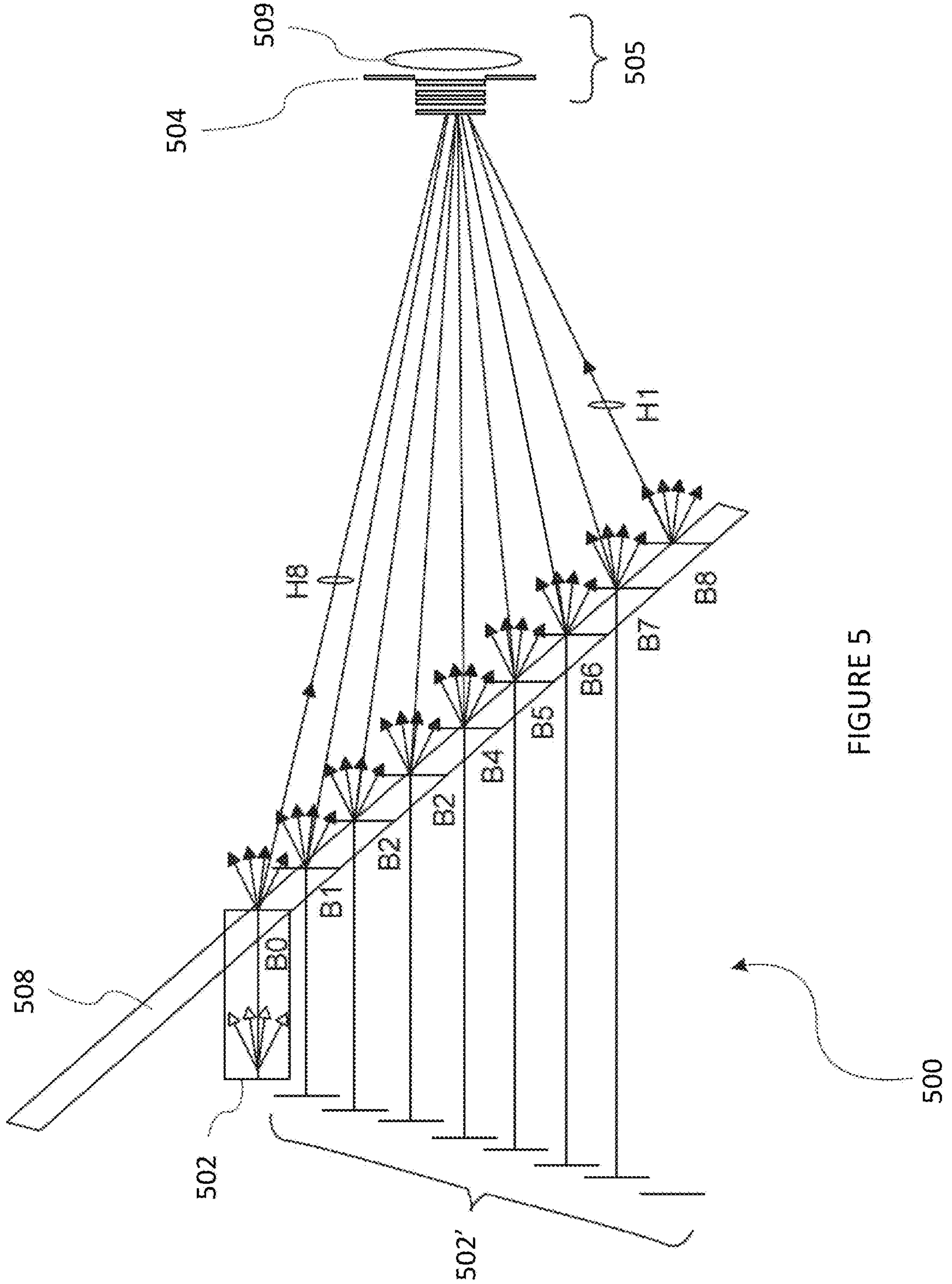
FIG. 5 shows a system arranged to route the light content of each hologram channel of FIG. 4B through a different optical path to the eye.

FIGS. 4A to 5 show an example of a type of hologram that may be displayed on a display device such as an SLM, which can be used in conjunction with a pupil expander as disclosed herein. However, this example should not be regarded as limiting with respect to the present disclosure.

FIG. 4A shows an image 452 for projection comprising eight image areas/components, V1 to V8. FIG. 4A shows eight image components by way of example only and the image 452 may be divided into any number of components. FIG. 4A also shows an encoded light pattern 454 (i.e., hologram) that can reconstruct the image 452—e.g., when transformed by the lens of a suitable viewing system. The encoded light pattern 454 comprises first to eighth sub-holograms or components, H1 to H8, corresponding to the first to eighth image components/areas, V1 to V8. FIG. 4A further shows how a hologram may decompose the image content by angle. The hologram may therefore be characterised by the channeling of light that it performs. This is illustrated in FIG. 4B. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

FIG. 5 shows a viewing system 500, including a display device that displays a hologram that has been calculated as illustrated in FIGS. 4A and 4B.

The viewing system 500 comprises a display device, which in this arrangement comprises an LCOS 502. The LCOS 502 is arranged to display a modulation pattern (or 'diffractive pattern') comprising the hologram and to project light that has been holographically encoded towards an eye 505 that comprises a pupil that acts as an aperture 504, a lens 509, and a retina (not shown) that acts as a viewing plane. There is a light source (not shown) arranged to illuminate the LCOS 502. The lens 509 of the eye 505 performs a hologram-to-image transformation. The light source may be of any suitable type. For example, it may comprise a laser light source.

The viewing system 500 further comprises a waveguide 508 positioned between the LCOS 502 and the eye 505. The presence of the waveguide 508 enables all angular content from the LCOS 502 to be received by the eye, even at the relatively large projection distance shown. This is because the waveguide 508 acts as a pupil expander, in a manner that is well known and so is described only briefly herein.

In brief, the waveguide 508 shown in FIG. 5 comprises a substantially elongate formation. In this example, the waveguide 508 comprises an optical slab of refractive material, but other types of waveguide are also well known and may be used. The waveguide 508 is located so as to intersect the light cone (i.e., the diffracted light field) that is projected from the LCOS 502, for example at an oblique angle. In this example, the size, location, and position of the waveguide 508 are configured to ensure that light from each of the eight ray bundles, within the light cone, enters the waveguide 508. Light from the light cone enters the waveguide 508 via its first planar surface (located nearest the LCOS 502) and is guided at least partially along the length of the waveguide 508, before being emitted via its second planar surface, substantially opposite the first surface (located nearest the eye). As will be well understood, the second planar surface is partially reflective, partially transmissive. In other words, when each ray of light travels within the waveguide 508 from the first planar surface and hits the second planar surface, some of the light will be transmitted out of the waveguide 508 and some will be reflected by the second planar surface, back towards the first planar surface. The first planar surface is reflective, such that all light that hits it, from within the waveguide 508, will be reflected back towards the second planar surface. Therefore, some of the light may simply be refracted between the two planar surfaces of the waveguide 508 before being transmitted, whilst other light may be reflected, and thus may undergo one or more reflections, (or 'bounces') between the planar surfaces of the waveguide 508, before being transmitted.

FIG. 5 shows a total of nine "bounce" points, B0 to B8, along the length of the waveguide 508. Although light relating to all points of the image (V1-V8) as shown in FIG. 4A is transmitted out of the waveguide at each "bounce" from the second planar surface of the waveguide 508, only the light from one angular part of the image (e.g. light of one of V1 to V8) has a trajectory that enables it to reach the eye 505, from each respective "bounce" point, B0 to B8. Moreover, light from a different angular part of the image, V1 to V8, reaches the eye 505 from each respective "bounce" point. Therefore, each angular channel of encoded light reaches the eye only once, from the waveguide 508, in the example of FIG. 5.

The methods and arrangements described above can be implemented in a variety of different applications and viewing systems. For example, they may be implemented in a head-up-display (HUD) or in a head or helmet mounted device (HMD) such as an Augmented Reality (AR) HMD.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 5 includes a single waveguide that provides pupil expansion in one dimension, pupil expansion can be provided in more than one dimension, for example in two dimensions. Moreover, whilst the example in FIG. 5 uses a hologram that has been calculated to create channels of light, each corresponding to a different portion of an image, the present disclosure and the systems that are described herebelow are not limited to such a hologram type.

Figure 6:
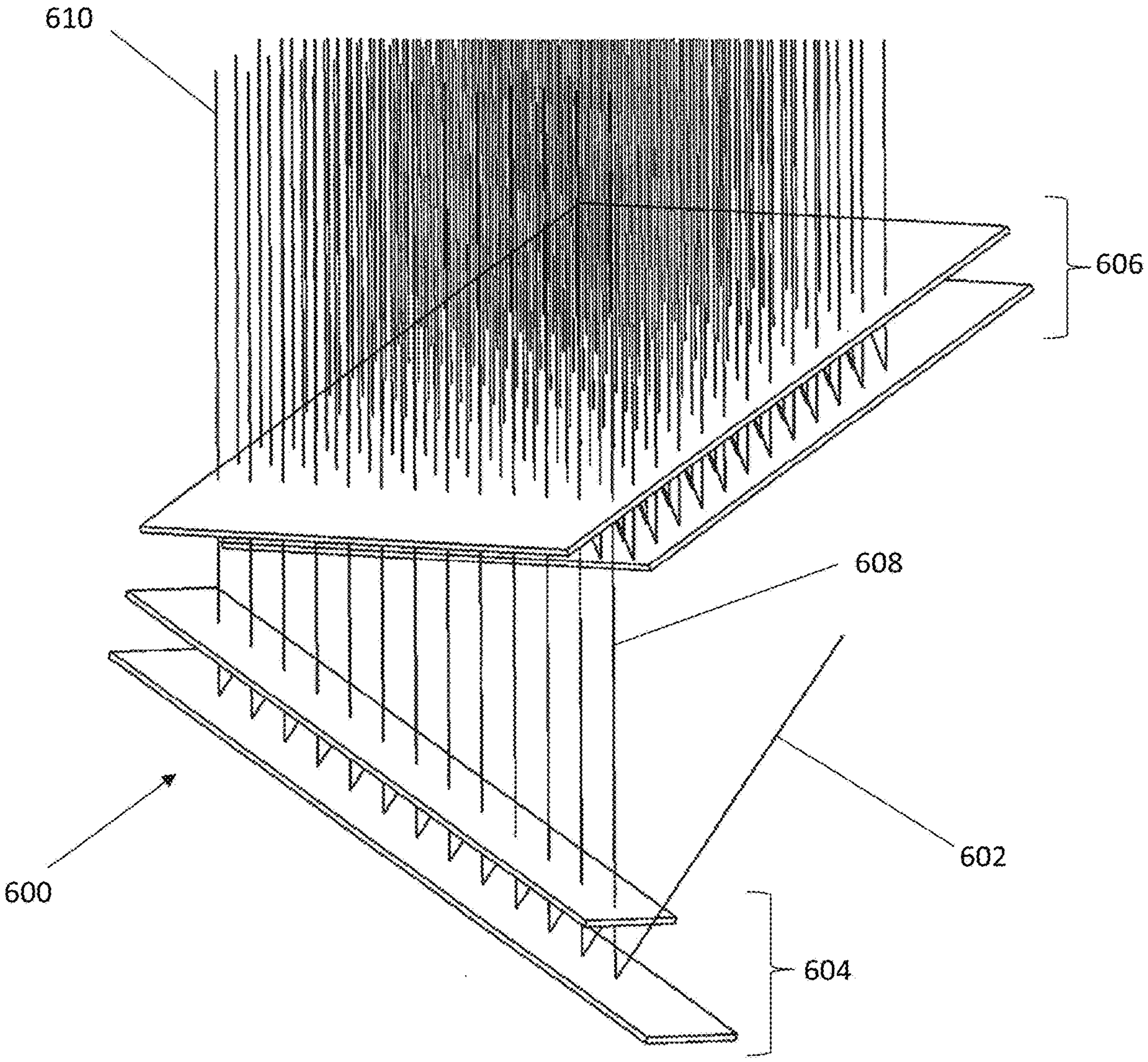
FIG. 6 shows a perspective view of a pair of stacked image replicators arranged for expanding a beam in two dimensions.

FIG. 6 shows a perspective view of a system 600 comprising two replicators, 604, 606 arranged for expanding a light beam 602 in two dimensions.

In the system 600 of FIG. 6, the first replicator 604 comprises a first pair of surfaces, stacked parallel to one another, and arranged to provide replication—or, pupil expansion—in a similar manner to the waveguide 508 of FIG. 5. The first pair of surfaces are similarly (in some cases, identically) sized and shaped to one another and are substantially elongate in one direction. The collimated light beam 602 is directed towards an input on the first replicator 604. Due to a process of internal reflection between the two surfaces, and partial transmission of light from each of a plurality of output points on one of the surfaces (the upper surface, as shown in FIG. 6), which will be familiar to the skilled reader, light of the light beam 602 is replicated in a first direction, along the length of the first replicator 604. Thus, a first plurality of replica light beams 608 is emitted from the first replicator 604, towards the second replicator 606.

The second replicator 606 comprises a second pair of surfaces stacked parallel to one another, arranged to receive each of the collimated light beams of the first plurality of light beams 608 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 608, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 6), light of each light beam within the first plurality of light beams 608 is replicated in the second direction. Thus, a second plurality of light beams 610 is emitted from the second replicator 606, wherein the second plurality of light beams 610 comprises replicas of the input light beam 602 along each of the first direction and the second direction. Thus, the second plurality of light beams 610 may be regarded as comprising a two-dimensional grid, or array, of replica light beams.

Thus, it can be said that the first and second replicators 604, 605 of FIG. 6 combine to provide a two-dimensional replicator (or, "two-dimensional pupil expander").

Improved Two-Dimensional Pupil Expander

The inventors have identified limitations of the usefulness and efficiency of pupil expanders in practical applications. For example, the skilled reader will be aware that many practical applications that require the use of pupil expansion have physical space constraints. For example, in automotive head-up displays, it may be desirable for a pupil expander to be provided in a limited space such as under the dashboard of the vehicle. Also, such spaces are often unstable environments, that move or vibrate, which is problematic for many conventional pupil expanders. Moreover, the pupil expander is usually provided as part of a larger display system, or viewing system, which comprises other optical elements, all of which may have to be physically constrained within a limited space. However, known pupil expanders generally require non-optimal compromises to be made between the degree (or, extent) of pupil expansion that is provided and the physical volume in space, and suitability to its surrounding environment, that the two-dimensional pupil expander occupies.

Even more so, the inventors have identified the technical problems associated with using waveguides to replicate/expand the pupil when the light field is a diffracted light field such as a holographic light field from a small display device. Unlike conventional imaging, holography embraces diffraction and it is advantageous to propagate diffracted/diverging light within the waveguide, rather than collimated light, when the image is formed by holographic reconstruction at the eye. A significant problem is that because the necessary display device is so small owing to the small pixel size needed for diffraction, the projection distance needs to be large (in relative terms) and so the size of the light field (in the cross-sectional dimension) also becomes large. Notably, the inventors found that it was possible to effectively "fold" a holographic light field in this dimension and retain all image content (albeit in the hologram domain) by using simple internal reflection from two complementary surfaces of the elongated waveguide—i.e. the other two elongate surfaces which do not contribute to pupil replication/expansion. Furthermore, the inventors devised a compact, stacked configuration which utilises a waveguide coupler to further fold the holographic light field thereby facilitating optimal (i.e. low volume) packaging.

The inventors have made recognitions that make it possible to provide a two-dimensional pupil expander for holography, which enhances the balance between efficiency, robustness, and compactness. The two-dimensional pupil expander disclosed herein enables the user to have a wide field of view—by enabling the user to receive all (or, at least a required portion of) the light output by a light emitter (such as an SLM or another pixelated device) with which the two-dimensional pupil expander is used—and also providing the user with a bigger eye-box than is conventionally achievable, thus enabling them to move their head and still see the required light. All of this is provided in a compact, robust and space-efficient manner. This can be understood further from FIG. 7 et seq.

FIG. 7 shows an improved system 700 comprising a first waveguide pupil expander 702, a waveguide coupler 704 (which is optional, in some embodiments) and a second waveguide pupil expander 706.

The first waveguide pupil expander 702 comprise a three-dimensional element. The first waveguide pupil expander 702 is substantially cuboidal in shape, with three pairs of mutually orthogonal faces, the first waveguide pupil expander 702 being relatively long along one dimension and being relatively short along each of the other two dimensions. However, the present disclosure is not limited to the particular size or shape of the first waveguide pupil expander 702 shown in FIG. 7.

The first waveguide pupil expander 702 comprises a first pair of parallel elongate faces 708*a*, 708*b*, which are shown as being, respectively, upper and lower faces in the particular arrangement shown in FIG. 7. The first waveguide pupil expander 702 further comprises a second pair of parallel elongate faces 710*a*, 710*b*, which are shown as being side faces in the particular arrangement shown in FIG. 7. The first waveguide pupil expander 702 further comprises a pair of relatively small end faces 712*a*, 712*b*, which are also parallel to one another. The relative terms 'upper', 'lower', 'side' and 'end' will be used herein in the description of FIG. 7, to facilitate understanding and for expediency, however it will be appreciated that the present disclosure is not limited to these relative terms and that the system 700 could be moved, rotated, or translated in any suitable manner whilst still functioning as described herein.

An input port on the upper elongate face 708*a* is arranged to receive input light 714. The upper elongate face 708*a* also comprises an output port (not specifically indicated in FIG. 7) at a substantially opposite end of the upper elongate face 708*a* to the input port, wherein the output port is the last transmission point, of a plurality of transmissions points, defined along the upper elongate face 708*a*.

Although the input light 714 is depicted by a single line in FIG. 7, the inventors have recognised a need/desire for the input light 714 to be non-collimated and/or comprise diverging light ray bundles. Thus, in embodiments, the input light 714 comprises diffracted or diverging light. The input light 714 may be received directly or indirectly from an SLM—for example, there may be one or more other optical elements between the SLM and the first waveguide pupil expander 702.

The first pair of parallel elongate faces 708*a*, 708*b* is arranged to function as a waveguide pupil expander (or, replicator) in a similar manner to that which is described above in relation to FIGS. 5 and 6. An inner surface of the lower face 708*b* is reflective and the upper face 708*a* is partially transmissive-reflective. Thus, the first pair of parallel elongate faces 708*a*, 708*b* are arranged to internally reflect or 'bounce' light between them along the elongate direction of the first waveguide pupil expander 702 and to transmit some light from each of a plurality of transmissions points on the upper face 708*a*, between the input port and the output port. Thus, the light of the hologram is replicated, or expanded, in the first direction. For short, it may also be said that the hologram is replicated.

Figure 8:
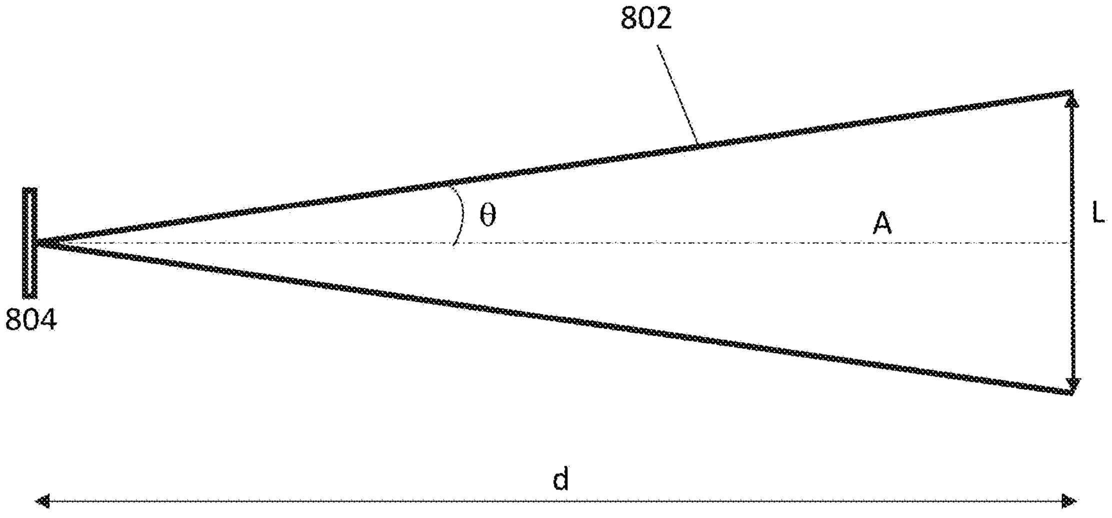
FIG. 8 shows a diffractive light cone output by a diffractive structure.

However, the inventors have recognised that, if the input light 714 is diffracted or diverging light (that is, light comprising diverging ray bundles), it will comprise an expanding light cone (as opposed to the one or more parallel beams that are comprised within collimated light), such that the size of the light cone—i.e., the size 'L' of the diffractive light field that the end, or mouth, of the cone defines, as illustrated in FIG. 8 herein—increases as the light propagates along its light path. This is a well-established principle of diffractive/diverging light and can be understood, for example, from the light cone 802 illustrated as being emitted from an SLM 804 in FIG. 8. As shown therein, the light cone 802 is emitted at a diffraction angle θ, which is an angle defined between an optical axis 'A' (that extends substantially perpendicular to a central point on the face of the SLM 804 from which light is emitted) and an outermost part, or limit, of the light cone 802 in either a positive or negative direction, relative to that axis 'A' (i.e., above or below the optical axis 'A', in the example shown in FIG. 8.) The size 'L' of the diffractive light field can be seen to depend, based on well-established trigonometric principles, both on the diffraction angle θ and on the distance 'd' from the SLM 804 at which that size 'L' is measured.

The inventors have thus made a further recognition, that if diffracted/diverging light was input into an elongate face of a first image replicator in conventional arrangements, there is a risk that the size of the light cone—i.e., the size 'L' of the diffractive light field defined by the end, or mouth, of the cone—would exceed the size of the pupil replicator along one of its shorter dimensions. In other words, if the first waveguide pupil expander 702 shown in FIG. 7 was of a conventional arrangement, there would be a risk that the size 'L' of the diffracted light field would, at some point along its propagation path between the upper 708*a* and lower 708*b* faces, exceed the side-to-side thickness of the first waveguide pupil expander 702. If that happened, in a conventional pupil expander, at least some of the light from the input light cone 714 would therefore escape through one or both of the side faces and thus would not correctly reach the intended viewer.

Thus, the inventors have provided an improved first waveguide pupil expander 702 wherein a second pair of parallel faces—in the example of FIG. 7, the pair of elongate side faces 710*a*, 710*b*—are also arranged to guide the light field from the input port towards the output port by at least one internal reflection. Such internal reflection enables the light of the spatially modulated light cone to remain trapped within the first waveguide pupil expander, even when the size of the diffractive light field would otherwise expand to a size that exceeds the size of the first waveguide pupil expander 702 in one or more dimensions, and for the light only to be transmitted via the plurality of transmission points defined on the elongate face that is specifically intended for pupil expansion—the upper elongate face 708*a*, in the example shown in FIG. 7. Thus, light comprising desired information, such as image-related information (such as, for example, encoded light of a hologram corresponding to an image) is not lost through the secondary faces of the first waveguide pupil expander 702. In short, the inventors found that it was possible to effectively "fold" the diffracted/holographic light field in this direction (using additional reflections from the other opposing surfaces) in order to retain all the necessary diffracted/holographic light content for reconstruction at the eye of a good quality image.

The inventors have recognised that, at least in some embodiments, the light launch conditions should be actively controlled such that the light within the first waveguide pupil expander 702 internally reflects off a second pair of opposing faces, in addition to being reflected/transmitted by a first pair of opposing faces. For example, it can be seen from the example in FIG. 7 that the input light 714 should enter the first waveguide pupil expander 702 at an angle of incidence (AOI), as defined relative to the normal of the face 708*a* via which it enters. Such an angle is required in order for propagation, at least between the first pair of opposing faces, to be established.

The inventors found that a combination of a relatively small thickness of the first waveguide pupil expander 702 and an angle of incidence (AOI) enables the first waveguide pupil expander 702 to provide high quality pupil expansion in a first direction (e.g., without any vertical dark/white bands.)

The first waveguide coupler 702 may be formed from any suitable material, in order for it to function as a waveguide as described herein. In embodiments, the inherent difference between the refractive index 'n' of the first waveguide coupler 702 and air will enable the second pair of parallel faces to provide internal reflection—e.g. total internal reflection—and thus to keep the diffractive light inside the first waveguide coupler 702, except when it is transmitted in a controlled manner from the output ports on the reflective/transmissive surface of the first pair of parallel faces. In other embodiments, at least one surface of the second pair of parallel faces may be coated or otherwise added to, by another material, in order to achieve the desired internal reflection and light trapping. This is discussed further below, in relation to subsequent figures.

The light output from the first waveguide pupil expander 702 comprises a plurality of replica light beams, output from a corresponding plurality of transmission points (not specifically shown in FIG. 7) on the upper elongate face 708*a*.

The output light is emitted from the transmission points at an angle (not specifically indicated in FIG. 7), wherein each of the output light beams is substantially parallel to each of the respective others. This can be seen from the light paths shown in FIG. 10, which shows an embodiment of the improved system disclosed herein, and which is discussed further below. Returning to FIG. 7; in some embodiments, pupil expansion is provided in only one direction, such that the waveguide coupler 704 and second waveguide pupil expander 706 shown in FIG. 7 are not required.

Thus, a display system is provided comprising a first waveguide pupil expander comprising an input port, output port, a first pair of parallel faces and a second pair of parallel faces, wherein the first pair of parallel faces are orthogonal to the second pair of parallel faces, wherein the first pair of parallel faces are arranged to light guide a diffracted light field from the input port to the output port by internal reflection therebetween and wherein a first face of the first pair of parallel faces is partially transmissive-reflective such that the light field is divided at each internal reflection and a plurality of replicas of the light field are transmitted through a region of the first face forming the output port, and wherein the second pair of parallel faces are also arranged to light guide the light field from the input port to the output port by at least one internal reflection. The second pair of parallel faces are not arranged to provide pupil replication by allowing partial transmission and, optionally, both faces thereof may be arranged for perfect light guiding to the output port—i.e. 100% (or near 100%) reflection.

The improved first waveguide pupil expander 702 disclosed herein enables a diffracted light field to be propagated therethrough, and so to be expanded in a first dimension. Thus, for example, light of a hologram—i.e., light which has been spatially modulated by a hologram displayed on an SLM or other display device but that has not been transformed to form a holographically-reconstructed image—can be propagated and expanded by the improved first waveguide pupil expander 702. Each "replica", or output light beam, formed by the first waveguide pupil expander, is effectively a replica of the hologram because the light is spatially modulated in accordance with the hologram. Informally, it can be said that the light is "encoded" with the hologram.

In embodiments in which the first waveguide pupil expander is provided in a compact form—such as in the relatively thin, elongate form shown in FIGS. 7 to 11 herein—the first waveguide pupil expander is advantageous because it reduces the overall size and weight of the display system in which it is comprised.

In embodiments in which pupil expansion is required in two dimensions, the first waveguide pupil expander 702 is oriented so that the plurality of output light beams are directed (either directly or indirectly, for example via one or more other components, as discussed further below) towards a receiving face 716*b* of a second waveguide pupil expander 706, which is arranged to provide pupil expansion in a second direction, substantially perpendicular to the first direction.

In the example of FIG. 7, the second waveguide pupil expander 706 comprise a three-dimensional element. The second waveguide pupil expander 706 is substantially planar in shape, with three pairs of mutually orthogonal faces, the second waveguide pupil expander 706 being relatively long along two dimensions and being relatively short along its third dimension. However, the present disclosure is not limited to the particular size or shape of the second waveguide pupil expander 706 shown in FIG. 7.

The second waveguide pupil expander 706 comprises a first pair of parallel rectangular (or, quadrilateral, or planar) faces 716*a*, 716*b*, which are shown as being, respectively, upper and lower faces in the particular arrangement shown in FIG. 7. These may be referred to as being the "major faces" or "major surfaces" of the second waveguide pupil expander. Each of the parallel rectangular faces 716*a*, 716*b* has a relatively large surface area, with the length and breadth of the rectangle being defined along the first and second elongated dimensions of the second waveguide pupil expander 706. The second waveguide pupil expander 706 further comprises a pair of parallel elongate side faces 718 and a pair of parallel elongate end faces 720, all of which have relatively small surface areas.

The first 702 and second 706 waveguide pupil expanders are oriented relative to one another in such a way that the plurality of output light beams from the first waveguide pupil expander 706 are directed towards the receiving face 716*b*—which, in this non-limiting example, is a lower face 716*b*—of the second waveguide pupil expander 706. Preferably, they are directed towards one end of the lower face 716*b*, such that a plurality of input ports are defined along/close to that end of the lower face 716*b*, wherein those input ports receive the plurality of output light beams from the first waveguide pupil expander 706. The system 700 is configured so that the light beams enter the second waveguide pupil expander 706, via the input ports, at an oblique angle, relative to a surface normal of the lower face 716*b*. Moreover, the second waveguide pupil expander 706 is preferably sized and oriented in order to receive each of the output light beams from the first waveguide pupil expander, in order to retain the pupil expansion that the first waveguide pupil expander 706 has provided in one direction, and to then expand each of those light beams in a second, substantially orthogonal direction, defined by the second elongate dimension of the second waveguide pupil expander 706.

An inner surface of the lower face 716*b* is reflective and the upper (transmitting) face 716*a* is partially transmissive-reflective. Therefore, due to a process of internal reflection between the two faces, and partial transmission of light from each of a plurality of output points on the upper face 716*a*, light of each light beam received via the input ports of the second waveguide pupil expander 706 is expanded (or, replicated) in the second direction. Thus, a second plurality of light beams is emitted from the waveguide pupil expander 706, wherein the second plurality of light beams comprises a plurality of replicas of the input light beam 714, along each of the first direction and the second direction. Thus, the second plurality of light beams may be regarded as comprising a two-dimensional grid, or array, of replica light beams. In embodiments in which the input diffracted/diverging light is light of a hologram—i.e., light that has been spatially modulated in accordance with the hologram and has not yet been transformed to form a holographically reconstructed image—each replica is, in effect, a replica of the hologram.

The skilled person will understand how, for example, the thickness of the second waveguide pupil expander and angle of incidence, AOI, may be determined for optimal two-dimensional pupil expansion in which the replicas are perfectly stitched together—i.e. adjoined.

In a further technical advancement, a waveguide coupler 704 is provided between the first 702 and second 706 waveguide pupil expanders. The waveguide coupler 704 is arranged to couple, or channel, light between the first 702 and second 706 waveguide pupil expanders. The shape of the waveguide coupler 704 may vary, dependent on the physical configuration and/or constraints of any given display system, but in the example arrangements of FIGS. 7 to 11, the waveguide coupler 704 is substantially triangular in cross section. The waveguide coupler 704 comprises two triangular shaped, parallel faces 722 that have relatively large surface areas and may be said to form the "major faces" of the waveguide coupler 704. In this example, they are right-angled triangle-shaped, but this should not be regarding as limiting. It also has three substantially rectangular faces 724 that form the connecting walls or side faces, between the two triangular faces 722, and that have relatively small surface areas, such that they may be said to form the "minor faces" of the waveguide coupler 704.

The waveguide coupler 704 is arranged to receive the plurality of replica rays of light that are output from the first waveguide pupil expander 702 and to output them towards the second wave guide pupil expander 706. As can be seen in FIG. 7, in this example arrangement the plurality of replica rays are received by a first minor face 724 and are output by a second, different minor face 724, which directs the plurality of replica rays towards a lower face 716*b* of the second wave guide pupil expander 706. The waveguide coupler 704 may have any appropriate shape, dependent on a desired or required relative positioning of the first and second waveguide pupil expanders 702, 706. In the particular arrangement shown in FIG. 7, factors such as the angular requirements for inputting light into each of the waveguide pupil expanders 702, 706, in order to achieve the desired internal reflection and pupil expansion, inherently lead to a triangular-shaped gap being present between the two waveguide pupil expanders 702, 706. The waveguide coupler 704 is configured to occupy that gap and to couple or channel the light between the two waveguide pupil expanders 702, 706 so that no light is lost during the propagation between the two waveguide pupil expanders 702, 706.

In embodiments in which the input light 714 comprises diffracted or diverging light, each of the replicas that are output by the first waveguide pupil expander 702 will also comprise diffracted or diverging light. Each of the replicas therefore comprises a cone of uncollimated light, wherein the light field that is defined at the mouth of the cone increases in size with increased propagation distance of the light. As a result, if the light travelled uncontrolled between the first 702 and second 706 waveguide pupil expanders, there would be a risk that some of that light would diverge away from the area defined by the input ports on the second waveguide pupil expander 706 and so would be lost, or at least would not reach the end viewer correctly. It is not desirable in many applications to increase the surface area of the second waveguide pupil expander 706 as physical compactness is often required, for example in head up display (HUD) systems and in particular in vehicle head up display (HUD) systems.

Therefore, the inventors have recognised that providing a waveguide coupler 704 between the two waveguide pupil expanders 702, 706 is an efficient and advantageous solution because the waveguide coupler 704 can be suitably formed, shaped, and sized to fit into a gap that is required between the two waveguide pupil expanders anyway, and within that gap it can provide a highly useful and important light control function. The inventors have further realised that, although it may be counter-intuitive to include an additional component within a pupil expander system, particularly if the intention is to incorporate the system into an environment in which compactness and/or weight reduction is advantageous, the presence of a waveguide coupler, and the benefits it brings as described herein, can outweigh the potential downsides of introducing an additional element. Furthermore, they have realised that, at least in some embodiments, the waveguide coupler can be formed to fit into a gap that inherently needs to be present between the first and second waveguide pupil expanders, anyway, such that the waveguide coupler does not significantly increase the overall size of the system, if at all.

For example, a face of the waveguide coupler 704 can be sized and shaped to correspond to an output face of the first waveguide pupil expander—or, at least, to correspond to the plurality of output light rays from the first waveguide pupil expander 702—so as to receive some or all of those replicas. This can be seen most clearly from the arrangements of FIGS. 10 and 11 herein. In those arrangements, as is also the case in FIG. 7, the cross-sectional shape of the waveguide coupler 704 is a substantially right-angled triangle. A first minor face 724 of the waveguide coupler 704 (in trigonometric terms, the minor face that is on the 'hypotenuse' side, in this example) is arranged to receive light from the first waveguide pupil expander 702. The light travels through the waveguide coupler 704 and is output from a second minor face 724 towards the second waveguide pupil expander 706. In the example arrangements of FIGS. 10 and 11, the light output from the waveguide coupler 704 is guided indirectly towards the second waveguide pupil expander 706, via a mirror 1002, which is discussed further below. However direct travel of the light from the waveguide coupler 704 to the second waveguide pupil expander 706, and indirect travel of the light therebetween via any suitable other element or elements, are also contemplated in the present disclosure.

The waveguide coupler 704 is formed from any suitable material or materials that enable(s) it to retain light therein and to direct it towards the second waveguide pupil expander 706. In embodiments in which the input light 714, and therefore the plurality of replicas output by the first waveguide pupil expander 702, comprise diffracted or diverging light, one or more faces of the waveguide coupler 704 may be arranged to provide internal reflection in order to prevent escape of diverging light out of the waveguide coupler 704 except through designated areas, such as output ports, that are intended to channel the light towards the second waveguide coupler 706. In the example arrangement of FIGS. 10 and 11, therefore, the triangular major faces 722 and/or one or more of the minor faces 724 that do not comprise the output ports may be configured to provide internal reflection, so that light is not permitted to escape except via the other minor face (which may be referred to as the "output face"), via which light is intended to travel towards the second waveguide pupil expander 706. The output face, via which light is intended to travel towards the second waveguide pupil expander 706 may comprise a transmissive surface.

The output face of the waveguide coupler 704 may be located, sized, and/or shaped to correspond with input ports on the second waveguide coupler 706. One or more other elements may also be used, between the waveguide coupler 704 and the second waveguide pupil expander 706, to suitably direct the plurality of replica rays towards the second waveguide pupil expander 706, for pupil expansion in a second direction. Again, this can be seen most clearly from FIGS. 10 and 11, in which the rays output from the waveguide coupler 704 are directed towards a mirror 1002, which reflects the rays towards an area located close to one end of a receiving side (in these examples, an underside) of the second waveguide pupil expander 706, from which the rays undergo the reflections and transmissions described above, to achieve two-dimensional pupil expansion. As well as ensuring that the replica rays reach the second waveguide pupil expander 706, the waveguide coupler 704 may ensure that they reach it at a desired angle. This may ensure that internal reflection is achievable in the second waveguide pupil expander 706 and that the outputs of the second waveguide pupil expander 706 are correspondingly correctly oriented. This helps to ensure overall correction function of the display system and, for example, to ensure correct positioning of the desired viewer eye-box. The inventors found that the waveguide coupler significantly helps minimise horizontal dark/white bands in 2D pupil expansion.

As discussed above, in many practical applications it is desirable and, in some cases, necessary to provide pupil expansion in a compact and space efficient arrangement, in order for the pupil expansion system to be implemented into a larger system, for example into a vehicle. Compactness can also be beneficial if the environment in which the pupil expansion system is to be provided is a moving, vibrating or otherwise unstable environment, for example a vehicle. The inventors have recognised that one or more of the waveguide pupil expanders, and optionally also the waveguide coupler, described hereabove may be arranged in a highly compact and efficient manner. For example, they have recognised that it is possible to arrange the first waveguide pupil expander and waveguide coupler, optionally along with another suitable optical element such as a turn mirror (or, a "fold mirror"), within a physical area defined by a "footprint" of the second waveguide pupil expander (which is necessarily bigger than the first waveguide people expander because it is arranged to retain the pupil expansion in the first direction and to add pupil expansion in the second, substantially orthogonal direction) and yet to provide the efficiency and effectiveness of the two dimensional pupil expansion described herein, even for diffracted/diverging input light rays.

In at least some cases, therefore, a display system (or, light engine) can be provided, in accordance with the recognitions made by the inventors, in which the first waveguide pupil expander, waveguide coupler and optionally one or more other elements, may be provided within a first layer, for example a lower layer, and the second waveguide pupil expander may be provided within a second layer, for example an upper layer, of a compact two-dimensional pupil expansion system. The compact two-dimensional pupil expansion system may have a cross sectional area that is equal, or substantially equal, to the cross-sectional area of a major face of the second waveguide pupil expander. In some cases, the compact two-dimensional pupil expansion system may have a cross sectional area that is slightly larger than, for example larger than to within a predetermined threshold or tolerance level, the cross-sectional area of a major face of the second waveguide people expander.

The compact two-dimensional pupil expansion system may form part of a viewing system, light engine, or display system, for example a head-up display (HUD) system, which includes an SLM or other pixelated display device on which an image or a hologram may be displayed. At least in some cases, the SLM or other display device may also be located so as to be within a footprint of the second waveguide pupil expander. For example, it may be provided within a lower layer, along with the first waveguide pupil expander and the waveguide coupler and optionally one or more other optical elements, with the second waveguide pupil expander forming (at least part of) a second, upper layer. The optical paths of light travelling from the display device to the second waveguide pupil expander, via the first waveguide pupil expander, waveguide coupler and any other optical elements provided, may also be located so as to fall within the physical footprint defined by a cross-sectional area of the second waveguide expander, or at least to within the physical footprint defined by a layer within which the second waveguide pupil expander is comprised. The first layer, within which the first waveguide pupil expander and waveguide coupler are comprised, may be contiguous with a second layer in which the second waveguide people expander is comprised. For example, the first and second layers may abut one another. For example, the first and second layers may be attached to one another. For example, the first and second layers maybe bonded to one another. The bonding may be provided via any suitable material that enables light propagation in the two-dimensional pupil expansion system to occur as disclosed herein, in order to provide compact and efficient two-dimensional pupil expansion. This can be understood further from FIGS. 9 to 12 herein.

Figure 10:
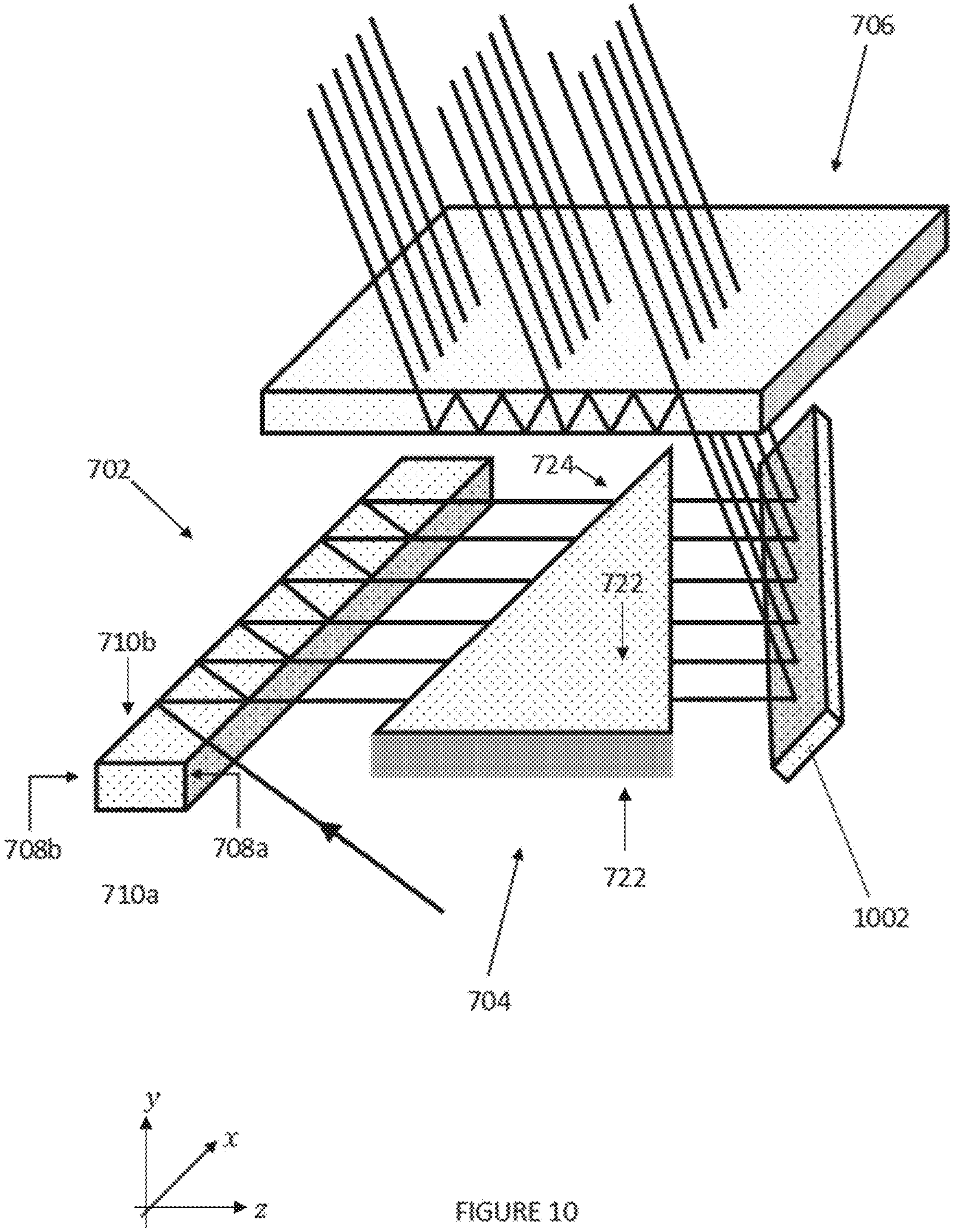
FIG. 10 shows an expanded view of the two-layered pupil expander of FIG. 9.

FIG. 10 shows an example arrangement comprising a first waveguide pupil expander 702, a waveguide coupler 704, and a second waveguide pupil expander 706 that function in a similar manner to that which has been described in detail above in relation to the similar arrangement that is shown in FIG. 7. Thus, the arrangement of FIG. 10 embodies the recognitions made by the inventors as described above. In FIG. 10 (and in FIG. 7), the major faces 722 of the waveguide coupler 704 are coplanar with the second pair of elongate parallel faces 710*a*, 710*b* within the first waveguide pupil expander 702, which (as described above) are arranged to provide internal reflection to trap light within the first waveguide pupil expander 702 and thereby to ensure that it only escapes via the output ports defined on one face of the other, first pair of parallel elongate faces 708*a*, 708*b* of the first waveguide pupil expander 702. In turn, the first pair of parallel elongate faces 708*a*, 708*b* of the first waveguide pupil expander 702, via which light enters and leaves, are arranged so as to be substantially parallel with a minor "input" face 724 of the waveguide coupler 704 that is configured to receive a plurality of replica light rays from the first waveguide pupil expander 702. In trigonometric terms, this minor face 724 is the 'hypotenuse' of the substantially right-angled triangle that is defined by the major faces of the waveguide coupler, in this example. This arrangement enables the first waveguide pupil expander 702 and the waveguide coupler 704 to be provided as part of a first relatively thin layer. Also provided within that first, relatively thin layer in FIG. 10 is a mirror 1002, which may be referred to as being a 'turn mirror'. The mirror 1002 is arranged to change the direction of the light that is output from the waveguide coupler 702. It will be appreciated that the mirror 1002 is one example of an optical element that can redirect the light in the manner shown, and that one or more other elements may be used instead, to perform this task.

Figure 11:
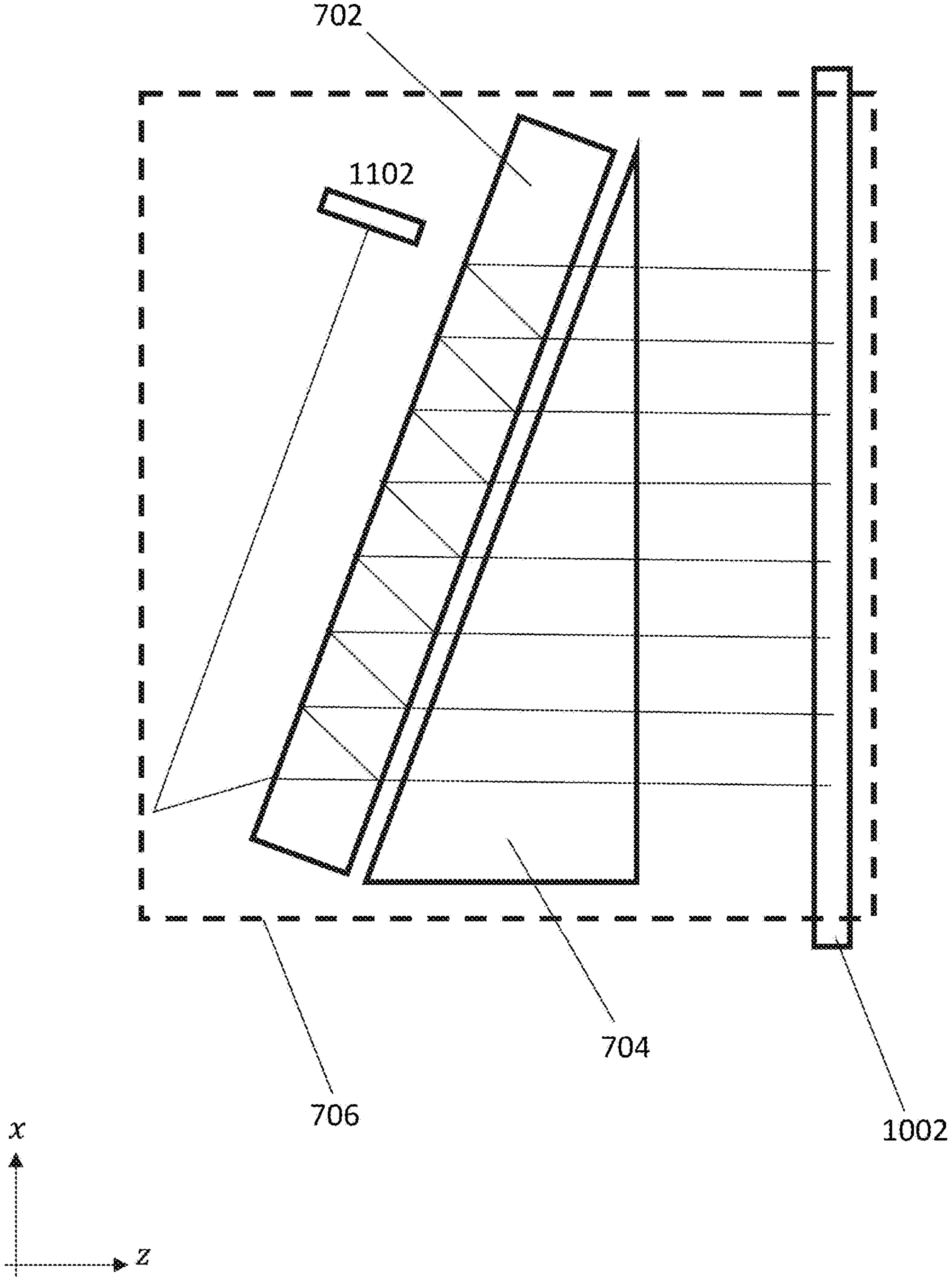
FIG. 11 shows a plan view of the two-layered pupil expander of FIG. 10, further including a spatial light modulator (SLM)

In the arrangement depicted in FIG. 10, the mirror 1002 is configured to direct the light away from the layer/plane in which the first waveguide pupil expander 702 and waveguide coupler 704 are located and instead direct it towards a second layer, substantially parallel to the first layer, wherein the second waveguide pupil expander 706 is located within that second layer. The mirror 1002 is suitably located within the first layer and is tilted so as to direct the light towards the second layer which, in the example shown is located above the first layer, however this relative positioning should not be regarded as limiting on the present disclosure. As can be seen even more clearly from the plan view shown in FIG. 11, the first waveguide pupil expander 702, waveguide coupler 704 and mirror 1002 comprised within the first layer, in this example arrangement, all fall within the physical footprint of the second layer which is defined by the cross-sectional area of a major face of the second waveguide pupil expander 706. FIG. 11 also shows an SLM 1102 provided within the first layer, also within the same footprint. In FIG. 11 the light output by the SLM 1102 is directed towards an input port of the first waveguide pupil expander 702 by one or more suitable optical elements, which are not shown but which preferably also fall within the same footprint.

Although a mirror 1002 is shown in FIGS. 10 and 11, alternative arrangements are contemplated in which a mirror or other optical element is not required for directing the light replicas from a first layer, in which the first waveguide pupil expander 702 and waveguide coupler 704 are located, to a second, preferably parallel, layer in which the second waveguide pupil expander 706 is located. For example, one or more surfaces of the waveguide coupler 704 may be formed or coated or otherwise arranged so that the light is directly output by the waveguide coupler 704 in a direction that is non coplanar with the first layer, and which directs the light towards a suitable input port region of the second waveguide pupil expander 706.

It can also be seen from FIG. 11 that, in order to ensure the correct input and output angles for the waveguide pupil expanders 702, 706, for example to achieve internal reflection therein, the elongate dimension of the first waveguide pupil expander 702 is tilted relative to each of the dimensions that define the major face of the second waveguide pupil expander 706. The inventors have recognised that when the first waveguide pupil expander 702 is tilted in this manner, it is possible to locate it within the physical footprint of the major face of the second waveguide pupil expander 706. In contrast, if the first waveguide pupil expander 702 is not tilted on this plane, it can be seen from FIGS. 10 and 11 that, instead, the second waveguide pupil 706 would need to be tilted on its plane otherwise optical performance would be compromised. Accordingly, the tilt of the first waveguide pupil expander 702 on the lower layer provides the technical advancement of optimising packaging—i.e. minimising volume by allowing that the bottom layer of components falls within the footprint of the top layer of components. Such tilting naturally creates a substantially triangular gap between the first waveguide pupil expander and the perimeter of the footprint of the second waveguide pupil expander. This inherent triangular gap shape therefore lends itself to a substantially triangular waveguide coupler 704, as illustrated in FIG. 11 and as described in detail hereabove.

Figure 9:
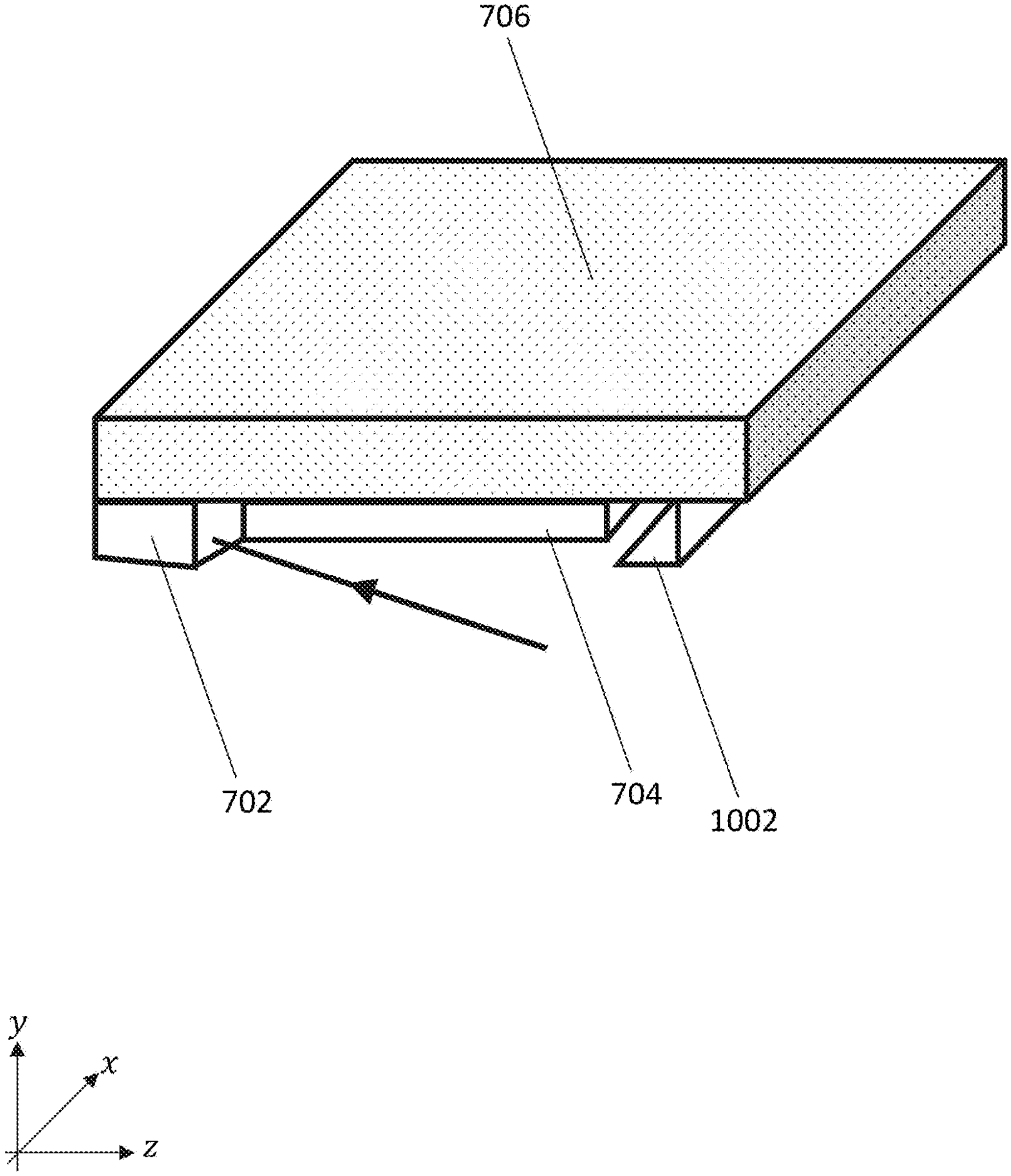
FIG. 9 shows a two-layered pupil expander.

As shown in FIG. 9 herein, the first layer comprising the first waveguide pupil expander 702 and waveguide coupler 704, and optional mirror 1002, can be provided directly adjacent or adjoining to the second layer that comprises the second waveguide pupil expander 706. Optionally, any surface(s) within the first layer that abut/s the second layer can be provided with a reflective coating. In some embodiments, the second pair of parallel faces 710*a*, 710*b* of the first waveguide pupil expander 702 and the triangular major faces 722 of the waveguide coupler 704 provide light guiding owing to total internal reflection based on a refractive index difference and appropriate angle of incidence (as will be familiar to the person skilled in the art). However, in other embodiments, a suitable mirror coating may be provided on second pair of parallel faces 710*a*, 710*b* of the first waveguide pupil expander 702 and/or the triangular major faces 722 of the waveguide coupler 704 to provide internal reflection within the first waveguide pupil expander 702 and waveguide coupler 704, respectively, that compensates for the diffraction angle of the diffracted light.

Figure 12:
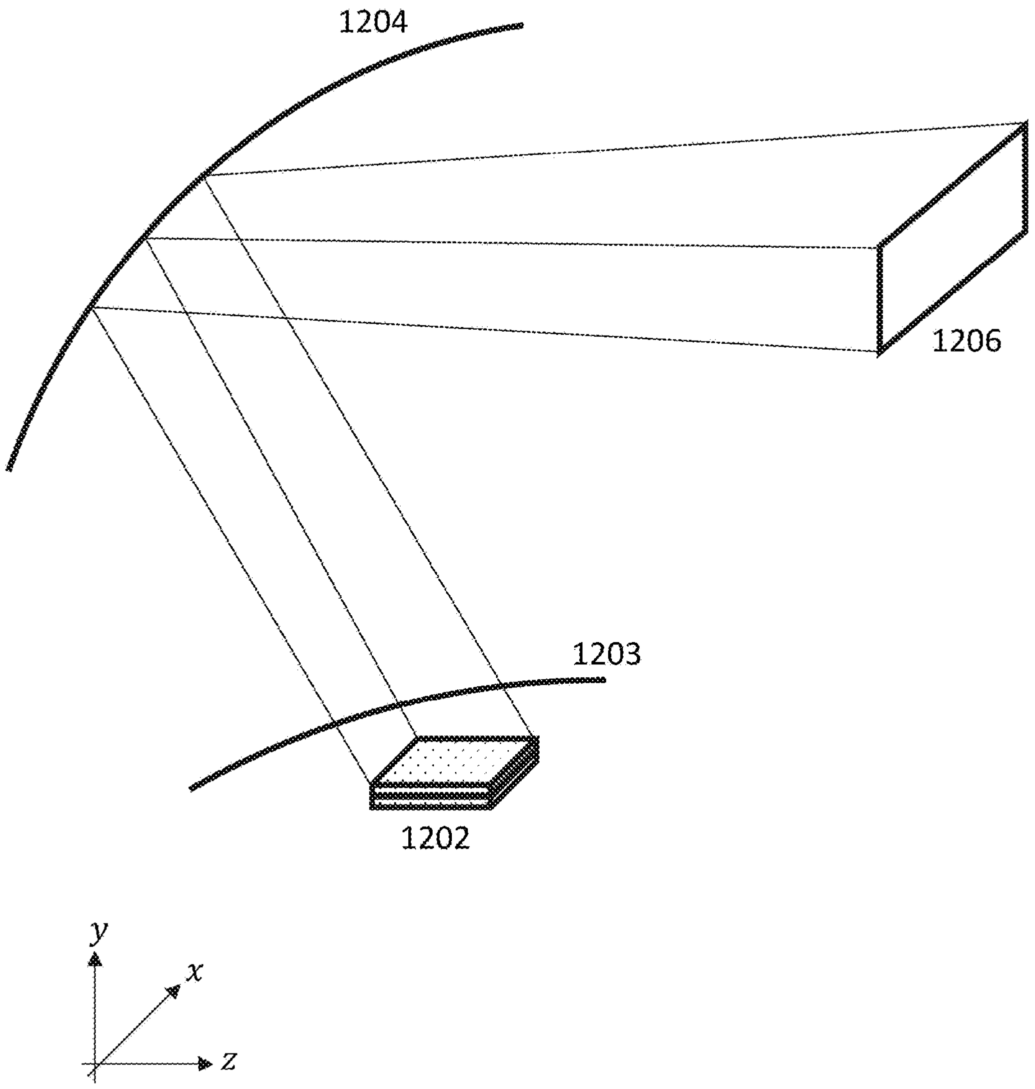
FIG. 12 shows a head-up display system including a pupil expander.

As shown in FIG. 12 herein, the recognitions made by the inventors enable a system that includes or comprises a two-dimensional pupil expansion system as described herein to be provided in a highly compact and stable form. For example, FIG. 12 shows a head up display (HUD) system that is provided as a HUD package 1202 comprising a plurality of substantially quadrilateral layers that abut one another—for example, they may be bonded to one another in any suitable manner. The HUD package 1202 comprises the elements shown in, and described above in relation to, FIG. 11 in first and second layers. It may also comprise additional elements within those layers and/or within a third (or subsequent) substantially parallel and relatively thin (planar) layer that abuts one or more respective other layer (s) within the HUD package 1202. As a result, the HUD package 1202 is formed in a compact and regular shape that may be incorporated into a variety of different environments. For example, in the example of FIG. 12, it is shown located beneath the dashboard 1203 in an automotive vehicle, but this should not be regarded as limiting on the present disclosure. Because of the regular-shaped and layered configuration of the HUD package 1202, it is relatively straightforward for a user, for example a manufacturer, to incorporate it into its surroundings in a desired orientation and location. For example, in FIG. 12 the HUD package 1202 is oriented so that the major surfaces of its layers are substantially horizontal, as a result of which the light is directed towards the windscreen 1204 of the vehicle at a suitable angle to ensure that the light is reflected or otherwise redirected from the windscreen 1204 towards a viewer's eyebox 1206, which is defined in a substantially vertical plane. However, in other examples, the HUD package 1202 is tilted relative to the horizontal plane in order to provide optimal packaging—e.g. minimal volume.

The provision of the two-dimensional pupil expansion (or, pupil replication) system as described here in in a compact form, for example in a regular-shaped compact form, with its components located as close as possible to one another while still ensuring the correct angles of light propagation, is further beneficial in terms of simplifying and reducing the financial costs of manufacturing. In other words, it is simpler and more cost efficient to manufacture the first and second waveguide pupil expanders and, if applicable, the waveguide coupler together, for example as a single, layered component, rather than manufacturing them separately and arranging them together thereafter. Moreover, it is beneficial both from a manufacturing efficiency perspective and from a financial cost perspective to reduce the physical size of the waveguide pupil expanders, such as making the first waveguide pupil expander in a thin elongated shape. This may, in turn, enable higher quality optical surfaces or optical materials to be used than would be possible for a conventional, less compact and/or more irregular system arrangement. In addition, the regular and compact shape of the two-dimensional pupil expansion system as described herein enables it to be more physically stable and robust, for example when located in a challenging environment such as in a vehicle, than is typically achievable for conventional two-dimensional pupil expansion systems.

The improved systems disclosed herein enable diffracted or diverging light to be replicated in at least one dimension, via one or more waveguide pupil expanders, which has not been achievable with conventional viewing systems. As a result, light output by a diffractive structure, including but not limited to light that has been encoded by a hologram, can be replicated, or expanded, in one or more dimensions before being transmitted to a viewer. Such expansion enables the viewer to have a larger eye-box, within which their eye(s) may be located whilst still capturing the required light, thereby enabling the viewer to see or perceive an image (such as an image corresponding to the hologram) from a larger number of different eye positions.

Waveguide Aperture

The arrangements and methods described herein are applicable to a viewing system with a single viewing aperture, or entrance pupil, and also to a viewing system that has multiple entrance pupils—for example, and most commonly but not limited to, to a human viewer having two eyes.

The inventors have recognised that, at least in some cases, consideration should be given to the possible effects when a viewing system has multiple entrance pupils. In other words, they have recognised that it may be suitable to provide control as to how and when multiple replicas of a common diffracted light field reach a viewer or other viewing system. For example, at least in some cases, it may be appropriate to prevent two replicas of an identical diffracted light field simultaneously reaching both the left eye and the right eye of a viewer since the human brain would not expect both eyes to receive identical content at the same time, given that those eyes are physically displaced from one another. The present inventors have recognised that control may be provided so that the different respective positions of the viewer's two eyes (and, correspondingly, the different respective locations of two or more entrance pupils within any multi-entrance pupil viewing system) may be accounted for, to ensure that no image or part of an image (or, no holographic light pertaining to the same image or part of an image) is identically received by both eyes at substantially the same time. This is described in more detail in particular relation to the type of hologram described with respect to FIGS. 4A to 5 herein—see co-pending GB patent application GB2108456.1, the entirety of which is incorporated herein by reference. However, the present disclosure, including the use of a waveguide aperture as described further herebelow, is applicable to pupil expansion for any type of diffracted or diverging light field, including but not limited to diffracted light fields that are modulated by a hologram of any type including but not limited to a Fourier hologram, a point-cloud hologram, or a Fresnel hologram.

Thus, in some embodiments, a control device is provided within the display system and is arranged to control the transmission of at least some of the replicas of the diffracted light within the system. The control device may be referred to as being an "aperture" or a "waveguide aperture" because it can be configured to provide aperturing—or, the selective blocking and transmission of particular light paths—that one or more components of the system is configured to output. It is configured to do so by selectively having one or more "open zone" that transmits light therethrough and one or more "closed zone" that blocks light (i.e., that is non transmissive). The "zones" may be referred to as being "apertures" but it should be understood that they may not be physically distinct or discrete formations, but that they may be software controlled and so may be dynamically variable in position and form. For example, the ratio of open zones to closed zones may be dynamically variable, as may be the size and location of any given zone. A time period in which a particular configuration of open and closed zones of the control device is adopted may be referred to as a "phase". The control device may be controlled to cycle or change between respective phases on a dynamic, often very fast, basis.

In some embodiments, the control device is provided downstream, such as immediately downstream, of the first waveguide pupil expander. For example, the control device may be provided between the first waveguide pupil expander and (if present) the waveguide coupler and, more generally, it may be provided between the first and second waveguide pupil expanders. In some embodiments, the control device may be provided downstream of the second waveguide pupil expander instead of or in addition to providing a control device between the first and second waveguide pupil expanders.

Returning to the embodiment shown in FIGS. 10 and 11 herein, the control device may be provided substantially within the same layer as the first waveguide pupil expander 702 and (if present) the waveguide coupler 704. For example, the control device may be fixed to, for example bonded to, the first waveguide pupil expander 702 and/or to the waveguide coupler 702.

For example, the control device may comprise an elongated structure that may be located between the first waveguide pupil expander 702 and the waveguide coupler 704. It may be arranged substantially parallel to the first waveguide pupil expander 702 and/or it may have an elongate size that enables it to intercept some of, preferably most of, preferably all of, the replicas of the diffracted light field that the first waveguide pupil expander 704 is configured to output. The control device may be controlled so as to selectively transmit or block the onward transmission of at least some of those replicas, in order to control the hologram content that reaches the viewer—for example, to control which hologram content reaches each of the viewer's eyes—on a dynamic basis. The control device may be switchable between allowing none, or all, or a selected number and of the replicas to be transmitted therethrough.

In some embodiments, the control device comprises a substantially flat liquid crystal display panel arranged to provide customized shuttering of light, which selectively lets through particular replicas based on viewer eye position. Eye position may be known to a controller of the control device via any suitable sensor and/or feedback means. The control device may be substantially co-planar with the waveguide pupil expander with which it is configured to operate.

In embodiments, the control device is also configurable to selectively control which portions of the diffracted light field, within an individual replica of the input diffracted light field, will reach the viewer at any given time. For example, it may be configured to control which range or ranges of diffractive angles, within a light cone defined by the diffracted light, are transmitted and which are blocked, on a dynamic basis.

The control device is referred to above as a "waveguide aperture" but any suitable control device may be used, to provide the function described herein. The control device, such as a waveguide aperture, may be formed from any suitable material. For example, it may comprise a liquid crystal device or a plurality, such as an array, of liquid crystal devices that can each switch between being opaque and transmissive. For example, the control device may comprise a "smart glass" or "switchable glass" whose light transmission properties can be altered when voltage, light, or heat is applied. The control device may be controlled by any suitable processor or controller. Its configuration may be changed rapidly, in order to coordinate, or synchronise, with the dynamic display of multiple different holograms on a display device, for example in order to transmit holographic light corresponding to different respective target images and/or to accommodate the movement of a viewer or viewing system.

The control device disclosed herein may take any number of different forms. In some embodiments, the control device comprises a plurality, such as a 2D array, of individually controllable light receiving/processing elements such as pixels. In some embodiments, the control device comprises a pixelated liquid crystal device or display. In some embodiments, the elements or pixels are operable in contiguous groups to form transmissive and non-transmissive "shutter zones". Each group of pixels may be switchable between a first mode e.g., transmissive and a second mode e.g., reflective. The person skilled in the art is familiar with how a pixelated display device may be controlled in order that the size and position of groups or zones of pixels—each zone having a different response to light—may be changed in operation such as in real-time. In embodiments, each zone is larger than the pixel size of the control device. Each zone may therefore comprise a plurality of pixels. The person skilled in the art is equally familiar with how optical components such as polarisers and waveplates may be implemented in conjunction with a pixelated liquid crystal device to provide a reconfigurable light shutter. By way of example only, the control device may utilize polarization selection, but other schemes based on other characterizing properties of light are equally applicable. In some embodiments, the control device comprises a pixelated liquid crystal display and, optionally, other optical elements collectively configured to transmit light having a first polarization and absorb or reflect light having a second polarization, optionally, wherein the first polarization and second polarization are opposite or complementary. For the avoidance of doubt, any number of different optical systems may be used to form the control device depending on the characteristics, such as polarization and wavelength, of the light forming the image and the present disclosure is not therefore limited by the construction of the control device. It will therefore be understood that the control device disclosed herein is defined by its functionality rather than its structure.

The control device is dynamically reconfigurable. The reader should appreciate that the total area of the control device that is blocked/non-transmissive or unblocked/transmissive is generally not constant during its operation. In some embodiments, the control device is pixelated. That is, the control device comprises an array of individually controllable pixels. Each pixel may comprise, for example, liquid crystal configurable between a transmissive state and non-transmissive state. Any imperfection in alignment between the edge of a pixel and an ideal aperture zone edge, may be dealt with by either letting through too much or too little light.

The examples described hereabove should not be regarded as limiting. For example, the viewing system may have more than two viewing apertures, or entrance pupils. For example, operation of the control device may be controlled according to any suitable "phase sequence" or timing scheme. For example, the control device may be selectively dormant.

In embodiments, two or more holograms, or two or more other diffractive patterns, may be interlaced with one another. In other words, the two holograms may be displayed alternately, in quick succession, so that the viewer perceives the two corresponding images as being formed substantially simultaneously.

Some phases of the control device may deliver more light content than some respective others. Similarly, both eyes need not receive the same amount of light content as one another in each phase, or in total, when multiple phases of the control device are interlaced with one another. For example, it may be possible for one eye to see more light content than the respective other, dependent on their relative positions and/or on other factors.

A display system comprising a control device such as a waveguide aperture as described herein may be configured to display a plurality of different diffraction patterns, and to output a plurality of corresponding different diffracted or diverging light fields, one after another and/or at different respective times. Thus, a display device within such a system may be configured to display different respective holograms, sometimes in rapid succession. The control device may be configured to be dynamically adaptable, to accommodate changes in the diffracted light field and/or changes in viewing requirements.

The system may be configured to display diffraction pattern corresponding to a sequence of images such as a video rate sequence of images. Each image may correspond to a frame of a sequence of frames having a frame rate such as 50 or 60 Hz. Each frame may comprise a plurality of sub-frames. The sub-frame rate may be 4 or 8 times the frame rate, for example. The displayed hologram may be changed for each successive sub-frame. Each sub-frame may be considered an individual display event. Each sub-frame may correspond to the image or at least a part of the image. Whilst embodiments have shown light being delivered to both eyes each display event, the present disclosure is not limited in this respect. For example, the light engine may be configured to deliver light to only one eye/entrance pupil per display event. The configuration of the waveguide aperture (i.e. the size and/or distribution of open and closed apertures/openings) may change every display event or every n display events, wherein n is an integer. In some embodiments, only one angular range of light is delivered to one eye per display event/aperture configuration. In some embodiments, the control system is configured to deliver light to each eye/entrance pupil in turn.

In some embodiments, a hologram of a target image may be calculated for a particular size and position of a viewing aperture—e.g., for a particular size and position of the entrance pupil of a viewer's eye. If a constraint such as entrance pupil diameter, or position changes, the hologram may be recalculated, even if the target image that is to be reconstructed at that time (and, hence, the image content that the viewer will see or perceive) remains the same. Each hologram need not have the same number or size of zones, even when two holograms represent the same target image.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD). In some embodiments, there is provided a vehicle comprising the display system installed in the vehicle to provide a HUD. The vehicle may be an automotive vehicle such as a car, truck, van, lorry, motorcycle, train, airplane, boat, or ship.

The quality of a holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some arrangements describe 2D holographic reconstructions by way of example only. In other arrangements, the holographic reconstruction is a 3D holographic reconstruction. That is, in some arrangements, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display system comprising:

a first waveguide pupil expander comprising an input port, output port, a first pair of parallel surfaces and a second pair of parallel surfaces, wherein the first pair of parallel surfaces is orthogonal to the second pair of parallel surfaces;

wherein the first pair of parallel surfaces is arranged to light guide a diffracted light field comprising diverging ray bundles from the input port to the output port by internal reflections therebetween, wherein the diffracted light field is spatially-modulated in accordance with a hologram displayed on a spatial light modulator and comprises an expanding light cone such that the light field size increases with propagation distance within the first waveguide pupil expander, wherein the diffracted light field has a light field size defined in a direction substantially orthogonal to a propagation direction of the light field, and wherein a first surface of the first pair of parallel surfaces is partially transmissive-reflective such that the light field is divided at each internal reflection and a plurality of replicas of the light field are transmitted through a region of the first surface that forms the output port; and wherein the second pair of parallel surfaces is also arranged to light guide the light field from the input port to the output port by at least one total internal reflection, wherein the light field size is substantially equal to or greater than a second spacing size, defined between first and second surfaces of the second pair of parallel surfaces during internal reflection of the light field within the first waveguide pupil expander, and wherein the second pair of parallel surfaces are arranged to retain the diffracted light field within the first waveguide pupil expander and such that the diffracted light field is directed to exit the first waveguide pupil expander via the output port.

2. The display system of claim 1, wherein the light field size is substantially equal to or greater than a first spacing size, defined between the first and second surfaces of the first pair of parallel surfaces.

3. The display system of claim 1, wherein the hologram comprises a computer-generated hologram.

4. The display system of claim 1, wherein the output port of the first waveguide pupil expander is coupled to an input port of a second waveguide pupil expander.

5. The display system of claim 4, wherein the second waveguide pupil expander is arranged to guide the diffracted light field from its input port to a respective output port by internal reflection between a third pair of parallel surfaces on the second waveguide pupil expander, wherein a first surface of the third pair of parallel surfaces is partially transmissive-reflective such that the light field is divided at each internal reflection and a plurality of replicas of the light field are transmitted through a region of the first surface on the second waveguide pupil expander, which forms its output port.

6. The display system of claim 1, further comprising a waveguide coupler having a receiving face, comprising an input port, which is configured to receive the light field output by the first waveguide pupil expander.

7. The display system of claim 6, wherein the waveguide coupler has a fourth pair of parallel reflective surfaces substantially corresponding to the second pair of parallel surfaces of the first waveguide pupil expander.

8. The display system of claim 7, wherein the output port of the first waveguide pupil expander is coupled to an input port of a second waveguide pupil expander, and wherein the fourth pair of parallel surfaces are arranged to guide the light field from the first waveguide pupil expander to the second waveguide pupil expander by at least one internal reflection.

9. The display system of claim 7, wherein a size of a separation between first and second surfaces of the fourth pair of parallel surfaces is substantially equal to the second spacing size, defined between first and second surfaces of the second pair of parallel surfaces.

10. The display system of claim 6, wherein the waveguide coupler has a substantially triangular shape that substantially fills a space between the first and second waveguide pupil expanders.

11. The display system of claim 4, wherein the first waveguide pupil expander is substantially elongated and the second waveguide pupil expander is substantially planar.

12. The display system of claim 4, wherein the first and second waveguide pupil expanders collectively provide pupil expansion in a first direction and in a second direction perpendicular to the first direction, wherein a plane containing the first and second direction is substantially parallel to a plane of the second waveguide pupil expander.

13. The display system of claim 4, wherein (i) the first and second directions of pupil expansion define a viewing plane and (ii) an area of pupil expansion defined by the first and second exit pupil expansion defines an eye-box area.

14. The display system of claim 4, further comprising a fold mirror between the first waveguide pupil expander and the second waveguide pupil expander, wherein the fold mirror is arranged to fold an optical path of the light field between the first waveguide pupil expander and the second waveguide pupil expander.

15. The display system of claim 14, further comprising a waveguide coupler having a receiving face, comprising an input port, which is configured to receive the light field output by the first waveguide pupil expander, wherein the fold mirror is arranged to fold an optical path of the light field between the waveguide coupler and the second waveguide pupil expander.

16. The display system of claim 4, further comprising a control device disposed between the first waveguide pupil expander and second waveguide pupil expander, wherein the control device comprises an array of apertures, each aperture selectively operable between a transmissive state and a non-transmissive state.

17. The display system of claim 16, wherein the array of apertures of the control device extends in an elongate direction of the first waveguide pupil expander.

18. The display system of claim 16, further comprising:

a waveguide coupler having a receiving face, comprising an input port, which is configured to receive the light field output by the first waveguide pupil expander; and a fold mirror between the first waveguide pupil expander and the second waveguide pupil expander, wherein the fold mirror is arranged to fold an optical path of the light field between the first waveguide pupil expander and the second waveguide pupil expander; and wherein the control device is one of (i) disposed between the first waveguide pupil expander and the waveguide coupler, (ii) disposed between the waveguide coupler and the second waveguide pupil expander, or (iii) disposed between the fold mirror and the second waveguide pupil expander.

19. The display system of claim 16, wherein the display system is, or is comprised within, a head-up display (HUD) system.

20. The display system of claim 19, wherein the HUD system is arranged in cooperation with an optical combiner such as a windscreen of a vehicle.

21. The display system of claim 19, wherein the output port of the first waveguide pupil expander is coupled to an input port of a second waveguide pupil expander, and wherein the HUD system defines a user eye-box that is substantially orthogonal to a plane defined by the second waveguide pupil expander.

22. A method of providing pupil expansion for a diffracted light field comprising diverging ray bundles, wherein the diffracted light field is spatially-modulated in accordance with a hologram displayed on a spatial light modulator and comprises an expanding light cone such that the light field size increases with propagation distance within the first waveguide pupil expander and has a light field size defined in a direction substantially orthogonal to a propagation direction of the light field, and wherein the method comprises:

directing the diffracted light field into a first waveguide pupil expander, wherein the first waveguide pupil expander comprises an input port, output port, a first pair of parallel surfaces and a second pair of parallel surfaces, wherein the first pair of parallel surfaces are orthogonal to the second pair of parallel surfaces;

guiding the diffracted light field from the input port to the output port by internal reflection between the first pair of parallel surfaces;

wherein a first surface of the first pair of parallel surfaces is partially transmissive-reflective such that the light field is divided at each internal reflection and a plurality of replicas of the light field are transmitted through a region of the first surface that forms the output port; and wherein the second pair of parallel surfaces are also arranged to light guide the light field from the input port to the output port by at least one total internal reflection, wherein the light field size is substantially equal to or greater than a second spacing size, defined between first and second surfaces of the second pair of parallel surfaces during internal reflection of the light field within the first waveguide pupil expander, and wherein the second pair of parallel surfaces retain the diffracted light field within the first waveguide pupil expander and ensure that the diffracted light field only leaves the first waveguide pupil expander via the output port.

* * * * *